(12) United States Patent
Mochizuki

(10) Patent No.: US 7,516,162 B2
(45) Date of Patent: Apr. 7, 2009

(54) METHOD, APPARATUS, AND PROGRAM FOR DOCUMENT MANAGEMENT

(75) Inventor: Takatoshi Mochizuki, Kobe (JP)

(73) Assignee: Konica Minolta Business Technoloiges, Inc., Tokyo (JP)

( * ) Notice: Subject to any disclaimer, the term of this patent is extended or adjusted under 35 U.S.C. 154(b) by 751 days.

(21) Appl. No.: 11/022,869

(22) Filed: Dec. 28, 2004

(65) Prior Publication Data

US 2006/0106830 A1 May 18, 2006

(30) Foreign Application Priority Data

Nov. 12, 2004 (JP) ............................. 2004-329583

(51) Int. Cl.
*G06F 17/30* (2006.01)
(52) U.S. Cl. ...................... 707/200; 707/2; 707/103 R; 707/203; 715/200; 715/229
(58) Field of Classification Search ......... 707/100–103, 707/1, 2, 103 R–103 Z, 200, 203; 715/200, 715/229
See application file for complete search history.

(56) References Cited

U.S. PATENT DOCUMENTS

| 5,220,625 | A | 6/1993 | Hatakeyama et al. |
| 6,009,442 | A | 12/1999 | Chen et al. |
| 6,055,530 | A | 4/2000 | Sato |
| 6,081,817 | A | 6/2000 | Taguchi |
| 6,582,474 | B2 * | 6/2003 | LaMarca et al. ............. 715/234 |
| 6,820,094 | B1 * | 11/2004 | Ferguson et al. ............. 707/200 |
| 2002/0091739 | A1 * | 7/2002 | Ferlitsch et al. ............. 707/526 |
| 2002/0186258 | A1 | 12/2002 | Shibata |
| 2003/0028553 | A1 * | 2/2003 | Kondo ......................... 707/200 |

FOREIGN PATENT DOCUMENTS

| JP | 2001-084246 | 3/2001 |
| JP | 2001-175648 A | 6/2001 |
| JP | 2002-366409 | 12/2002 |
| JP | 2002-366541 | 12/2002 |
| JP | 2003-036192 | 2/2003 |
| JP | 2003-036193 | 2/2003 |
| JP | 2003-036195 | 2/2003 |

OTHER PUBLICATIONS

Japanese Notification of Reasons for Refusal mailed Jan. 16, 2007, for Japanese Patent Application No. 2004-329583.

* cited by examiner

*Primary Examiner*—Cheryl Lewis
(74) *Attorney, Agent, or Firm*—Morrison & Foerster LLP

(57) ABSTRACT

There are provided a document file management method, comprising the steps of: virtually combining document files and producing, changing and deleting a virtual combination object for managing the virtual combination, along with the physical relationship of document files in the virtual combination; and producing, changing and deleting an index object for managing, by virtual sub-grouping, at least one or more document files included in the plurality of document file virtually combined by the virtual combination or one or more pages constituting the document file, and a document management apparatus and a computer program, using the method.

24 Claims, 24 Drawing Sheets

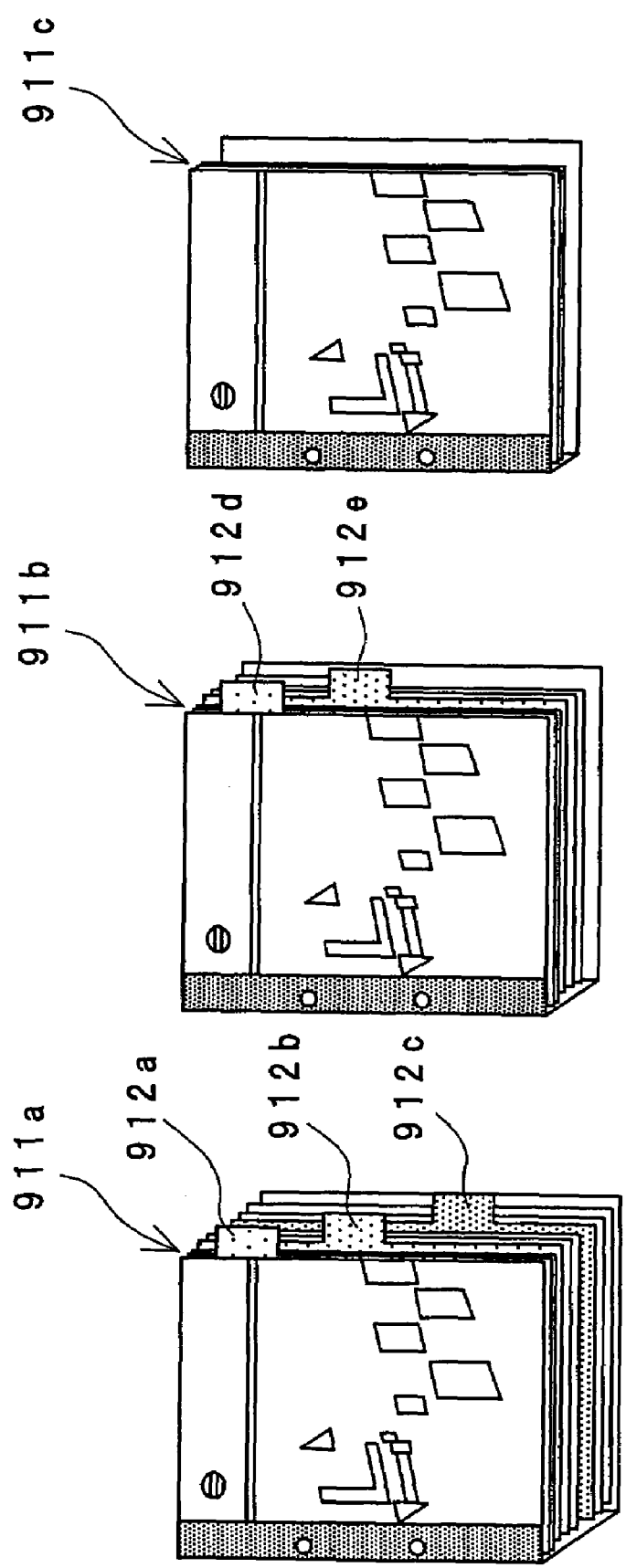

METHOD, APPARATUS, AND PROGRAM FOR DOCUMENT MANAGEMENT

This application is based on application No. 2004-329583 filed in Japan, the contents of which is hereby incorporated by reference.

BACKGROUND OF THE INVENTION

1. Field of the Invention

The present invention generally relates to document management, and in particular, to management of a plurality of document files converted into electronic data.

2. Description of the Prior Art

With the proliferation of computers, typified by personal computers, and the development of technology for software, such as word processors, a great number of documents are created as electronic data and stored in a recording medium connected to an computer or the like. Although those documents are managed as independent document files, in not a few cases, a plurality of files constitutes one document or a semantic unit. For this reason, there has been required a method for collectively managing and using a plurality of document files.

For example, there are some cases where a person to produce documents produces each chapter of documents as one file. There are also cases where a plurality of printed papers are converted into electronic data with a scanner or the like, and uses the electronic data converted into document data by the optical character recognition (OCR) function to complete documents. The completed documents are constituted of a plurality of document files each consisting of a plurality of pages.

In a stage where this completed document is used, the necessity arises to collectively issue a print command and other commands. However, it is time consuming, and could be an inducement for an operational error, to issue such a print command and other commands to each of a plurality of document files. Further, files of an enormously large total number also make the process thereof enormously complicated, and thereby the utility value of those electronic data might be viewed with suspicion.

Further, a management risk may arise. Managing a large number of electronic files with a record medium causes a user's attention to reduce, which may sometimes result in scattering of the files in a storage medium due to an unintentional operation error. It is time consuming to perform a thorough search in a storage medium of today having been increased in capacity. In the worst case, a user has no key for search, making necessary files remain unusable for a long period of time.

Gathering a plurality of files into one file can be considered to prevent the possibility that part of the plurality of files scatter. However, the capacity of the gathered file might be enlarged and, depending on capabilities of computers, a user might perceive deterioration in operability. There are some cases where a user in the first place does not desire for gathering the plurality of files into a single file.

Therefore, it has been necessary to develop a method and an apparatus for collectively managing and using a plurality of document files.

For example, in Japanese Patent Laid-Open Publication No. 2001-84246, a concept of a binder is introduced to enable collective management and processing of an assembly including a plurality of document files. In a storage device of a computer, a region for storing data concerning a binder object is provided for storing links to objects of document files bound up in the binder in the data region, to bind up a plurality of document files while keeping an independent state of each document file. Further, in the data region of the binder object, a variety of attributes, concerning the document file objects bound up in the binder, are stored. The attributes are read and necessary information processing is further performed for updating the attributes based on the processing result, thereby to realize display of a requested page, or form feed in a page unit or a document unit, in the document files being bound up in the binder. Each document file is kept in an independent state of the other document file being bound up together, and links to the document file objects are stored as data in the binder object. By updating the data, therefore, a change in order of documents included in the binder, and addition and deletion of a document to and from the document binder, can be performed without changing the document file.

A document management apparatus realized by Japanese Patent Laid-Open Publication No. 2001-84246 has a graphical user interface (GUI). An input device, such as a mouse, is used to operate an icon of a binder object to be displayed, an icon of a document file object bound up in the binder, and an icon of a document file object not bound up in the binder, and with the GUI, an information processing function according to the operation is performed. Further, the document management apparatus allows transmission of data for printing of a document file to a printing device so as to form a binding margin to the image of the binder.

However, in order to perform a process for changing an attribute of document file objects, e.g. changing a security setting (setting of a password etc.) for read-only setting, on one or more than one of document file objects bound up in the binder object, it is necessary to perform the process for changing an attribute separately on each document file. For this reason, with the increase in number of document file objects, a user needs to repeatedly operate the same process on the document management apparatus, thereby to force the user to greatly bear the burden of operation.

Further, when the binder is united to another binder to produce a new binder, a boundary between the original binders becomes unknown, making the user unable to distinguish whether the document files were previously bound up separately.

Further, in order to decompose the binders so as to constitute a plurality of binders consisting of document files included in the decomposed binders, it is necessary to temporarily reset separate links to the document files stored in the binder objects to set new links to new binder objects. Namely, the document files are temporarily decomposed to the separate file units in process of being decomposed to a plurality of binders. This requires the user to pay and make enormous attention and efforts for reconstitution of the binders. Also in this case, with the increase in number of the document file objects and the binder objects newly formed by the division, the user is required to spend and make enormous time and efforts for operating the document management apparatus.

For the reasons described above, there has been desired the function of sub-grouping any given files, included in a plurality of files in a virtually combined state, and performing a variety of processes in a simple and collective manner on a group of files included in the subgroup.

SUMMARY OF THE INVENTION

It is, accordingly, an object of the present invention to facilitate integrated management and processing of a plurality of virtually combined document files.

The present invention is directed to the provision of improved document management. In one aspect of the invention, there is provided an apparatus for managing an electronically recorded document file. The apparatus comprises of an input device for inputting information by an operator; a virtual combination editor for editing a virtual combination object based on information inputted in the input device; an index editor for editing the index object based on information inputted in the input device; and a document file manager for managing and processing the document file based on information recorded in the virtual combination object and the index object.

According to the present invention, it is possible by use of an index object to sub-group a plurality of document files, virtually combined by a virtual combination object. It is possible to perform a process on the document files in a collective and simple manner.

Other aspects, objects, and the several advantages of the invention will become apparent to one skilled in the art from a reading of the following disclosure and the appended claims.

BRIEF DESCRIPTION OF THE DRAWINGS

An embodiment of the invention will now be described by way of example and with reference to the accompanying drawings, in which:

FIG. 24 is a diagram of further examples of displays of virtual combinations.

DETAILED DESCRIPTION OF THE PREFERRED EMBODIMENTS

In the following, the present invention is described by explaining embodiments of the present invention with reference to the attached drawings.

Figure 1:
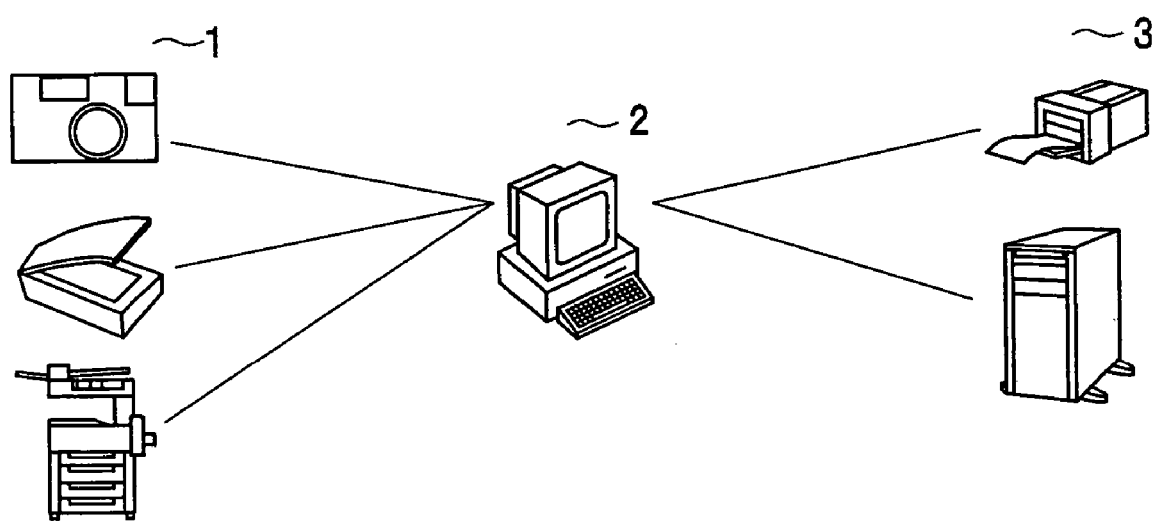
FIG. 1 is a schematic diagram of a document management system according to an embodiment of the present invention.

FIG. 1 is a schematic view showing the whole configuration of a document management system (hereinafter abbreviated as system) according to an embodiment of the present invention.

The present system comprises a file input device 1, a document management apparatus 2, and an external system 3. The file input device 1 is data-communicably connected to the file management apparatus 2. The file management apparatus 2 is connected to the external system 3 in a document-data transmittable manner from the file management apparatus 2. For example, the file input device 1 is a device capable of image input, such as a digital camera, a flatbed scanner, or a multi-functional peripheral (MFP). The file management apparatus 2 is a computer executable of a document management program of the present invention, such as a personal computer comprising a standard input and output devices. The personal computer is operated as a virtual combination editor for editing a virtual combination object, an index editor for editing an index object, and a document file manager for managing one or more document files, etc. by executing the document management program of the present invention, for example. The external system 3 is an external device capable of receiving document data, such as a printer, a file transfer protocol server (FTP server) or a mail server. Naturally, the MFP cited as an example of the file input device 1 can be simultaneously acted as the external system 3.

Figure 2:
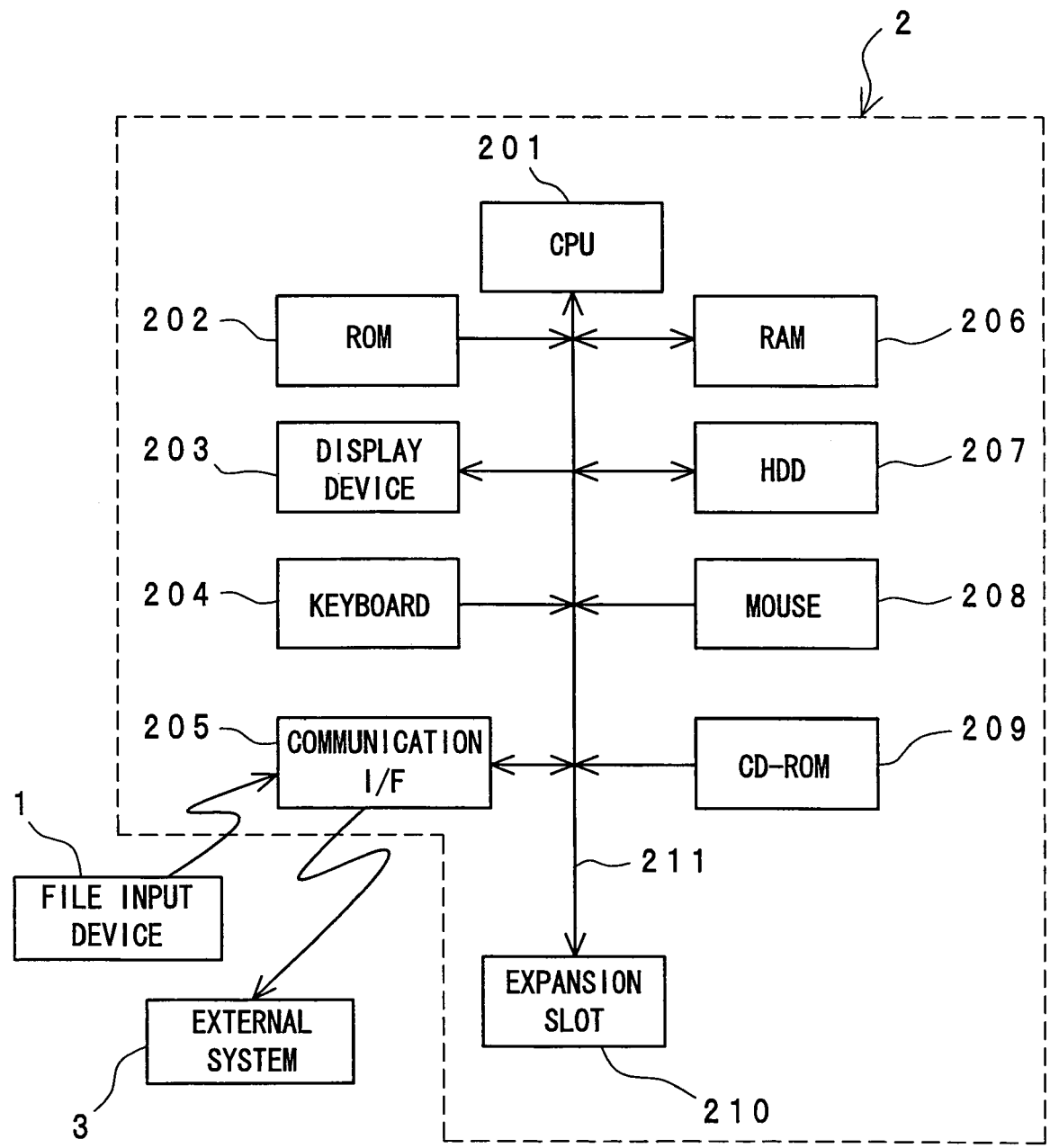
FIG. 2 is a block diagram of a document management apparatus.

FIG. 2 shows a block diagram of the file management apparatus 2. The file management apparatus 2 is for example a personal computer. A central processing unit (CPU) 201 for controlling the whole device is connected, via a data bus 211, with a read-only memory (ROM) 202 and a random access memory (RAM) 206 as a main storage devices to store a program, data, etc., a display device 203 for displaying an image, characters and the like, a keyboard 204 and a pointing device, a mouse 208, as input devices, a hard disc drive 207 as an auxiliary storage unit, a communication interface 205 for controlling communication with the file input device 1, the external system 3 or the like, a CD-ROM device 209, and the like.

A document management program (hereinafter abbreviated as program) for activating the present system is installed in the file management apparatus 2 and it can be executed by an operator at any time.

In the specification, a "virtually combined object" (herein after abbreviated as "virtual combination object" or "virtual combination") denotes an object having a data region for storing data needed for integrated management of a plurality of electronized document files as well as a variety of attributes data on concerning each document file. In this object, the stored data can be updated by an information processing operation. Although the virtual combination is displayed on a screen of the display device 203 as a binder binding up document file icons, this does not limit a display form of the virtual combination. Further, an "index object" (hereinafter abbreviated as "index") is an object having a data region for storing necessary data for subgrouping at least one of the plurality of electronized document file, included in one virtual combination object, or at least one page included in a document file in the virtual combination. In this object, the stored data can be updated by an information processing operation. Although the index is displayed in a form imitating an index paper on the display device, this does not limit a display form of the index.

Figure 3:
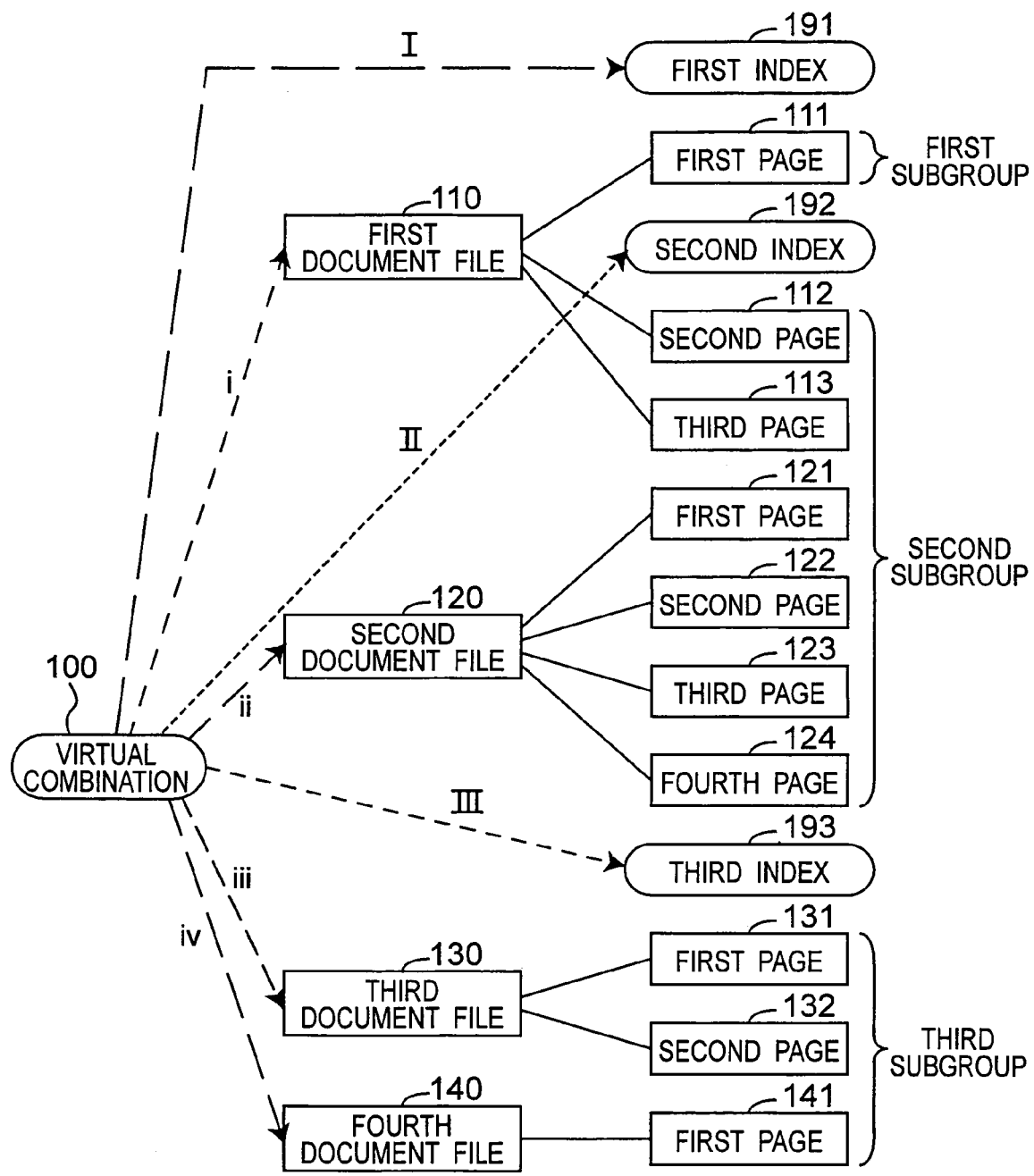
FIG. 3 is a view of an example for explaining a virtual combination and indexes.

The concepts of the virtual combination and the index used in the document management according to the present invention are shown with reference to FIG. 3. In the file management apparatus 2, a first, second, third and fourth document files 110, 120, 130 and 140 are recorded. As an object to virtually combine and manage those document files, a virtual combination 100 is provided. Links i, ii, iii, and iv, showing a combination of the first document file 110 to the fourth document file 140 by the virtual combination 100, are recorded in the data region of the virtual combination 100. Further, a physical relationship of the document files in the virtual combination 100 is also recorded in the data region. Herein, the order of the virtual combination by the virtual combination 100 is from the first document file 110 to the fourth document file 140.

Further, information on the insertion position of the indexes is also recorded in the data region of the virtual combination 100. In the present example, a first index 191 is set before the first page 111 of the first document file 110. A second index 192 is set before the second page 112 of the first document file 110. A third index 193 is set before the first page 131 of the third document file 130. The setting position of those indexes 191, 192 and 193 are recorded in the data region of the virtual combination 100 as links I, II and III, respectively.

In the case of the present example, the first index 191 sub-groups only a page immediately before the second index 192 as the subsequent index, namely only the first page 111 of the first document file 110. Information on process setting items, recorded in the data region of the first index 191, is effective to the page 111 belonging to the first subgroup.

In the same manner as above, the second index 192 sub-groups the range from the second page 112 of the first document file 110 to the fourth (final) page 124 of the second document file 120. Information on process setting items, recorded in the data region of the second index 192, is effective to the page 112 to the page 124, which belong to the second subgroup.

As set at a later position among the indexes included in the virtual combination 100, the third index 193 subgroups the range from the first page 131 of the third document file 130 to the first page 141 of the fourth document file 140 as the final page among those included in the virtual combination 100. In the same manner as above, information on process setting items, recorded in the data region of the third index 193 is effective to the pages and files, which belong to the third subgroup.

Further, the virtual combination and the index are displayed on the display device of document management apparatus 2, as for example shown in FIG. 18. On the display device, each page of the document file is stacked with slight displacement from its previous page to show inclusion of more than one page in the document file, and a binder symbol is provided at the left end of the document file to show the virtually combined state of the document file. Indexes 702a to 702f are displayed in the forms imitating index paper having tab parts and the tab parts are shown in the present figure. Each page of the document file becomes accessible by operating this virtual combination with a mouse or the like.

The operator can collectively control and process a plurality of virtually combined document files by editing the data regions in the virtual combination 100 and the indexes 191, 192, and 193, using the input device of document management apparatus 2. The operator can also process part of the plurality of document files included in the virtual combination 100.

For example, an index can be further inserted into or deleted from a virtual combination.

Figure 22:
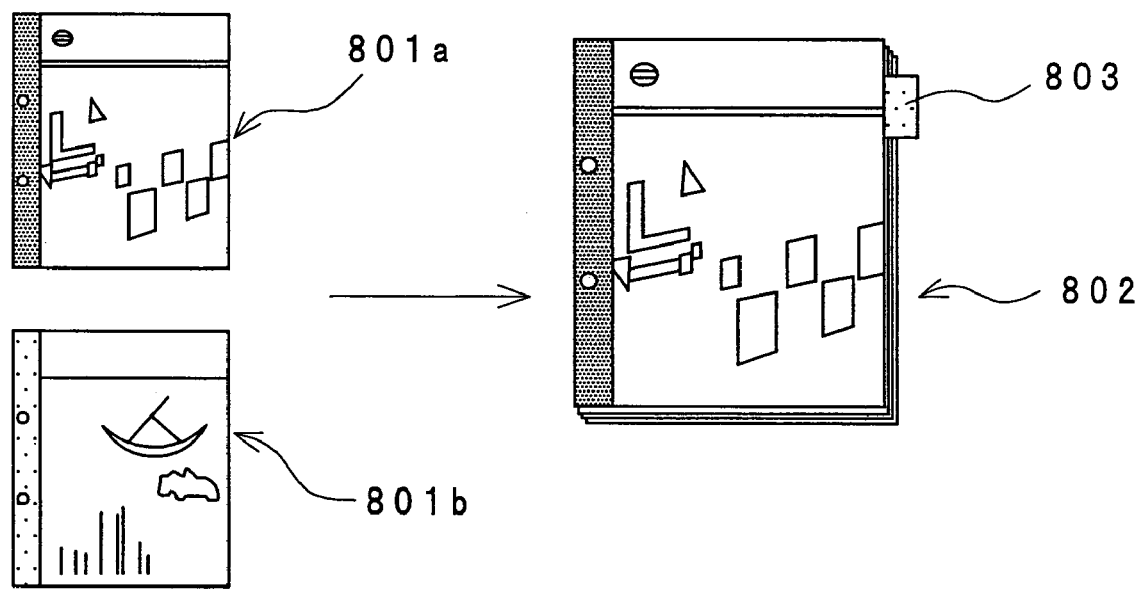
FIG. 22 is a diagram of an example for explaining combination between virtual combinations.

For example, virtual combinations can be combined to form one virtual combination (c.f. FIG. 22).

Figure 23:
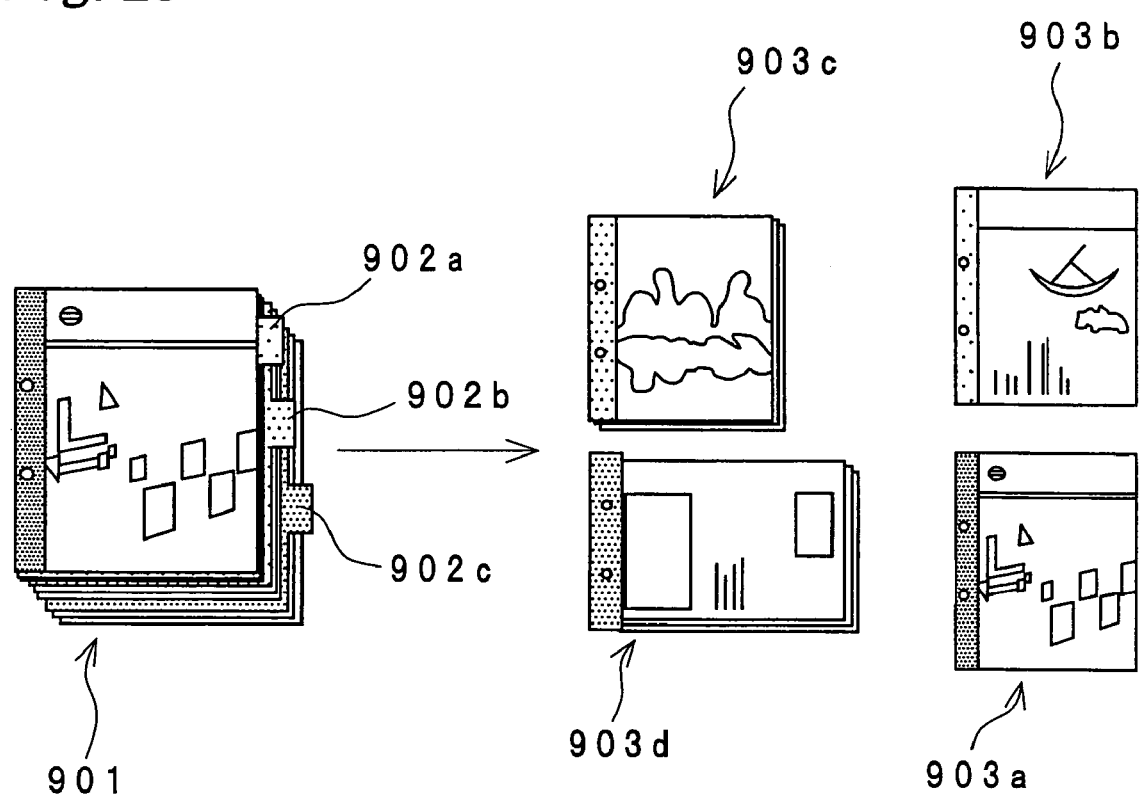
FIG. 23 is a diagram of an example for explaining decomposition of a virtual combination into a plurality of virtual combinations.

For example, a virtual combination can be decomposed into a plurality of virtual combinations (c.f. FIG. 23).

Further, it is possible by setting process setting items in an index to, for example, collectively perform process setting on pages included in a specific subgroup in a virtual combination. It is also possible by giving an operation command to the index to collectively perform an operation on the pages included in the subgroup. The process setting and operation are described later.

As thus described, introduction of the index, on the top of the virtual combination where a plurality of document files are virtually combined, allows collective processing of the whole or part of documents included in the virtual combination. Further, insertion of an index into a virtual combination formed of virtual combinations allows clarification of a boundary of the original virtual combination. Hence, the virtual combination can be decomposed into virtual combinations in units of subgroups defined by the indexes, instead of being decomposed into separate file units. This has therefore resulted in realization of comfortable document file management.

Figure 4:
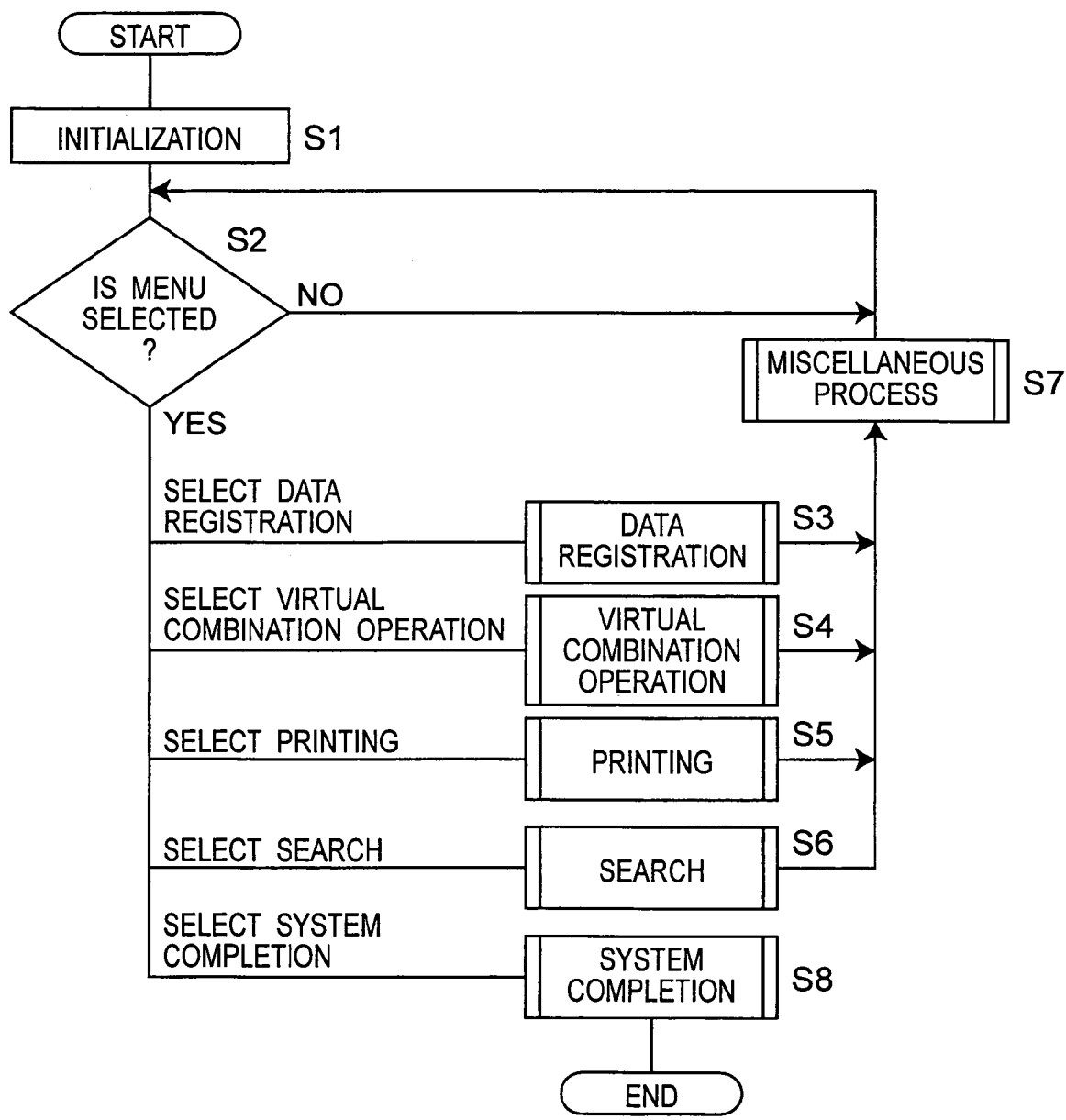
FIG. 4 is a flowchart of a main routine of a program of the present invention.

FIG. 4 shows a flowchart of a main routine of a program.

Upon activation of this program, first, an initial setting process is performed, such as initialization of flags and the like, which is required for execution of the present system, and display of an initial display screen, in an initialization step S1. In the step S1, states of an already formed virtual combination and index may be read from a main storage devices or an auxiliary storage device by a document file operation having been performed prior to the activation of the program, so as to restore the previous state of document management operation. It may be left to the operator's option whether the previous state of document management operation is restored or not. Herein, the document file refers to a file produced with a word processor or the like, an image file produced with a scanner or the like, or an electronic file suitable for display on a display device or printing with a printing device.

Next, the processing goes to a menu selection step S2. In this step, a message or the like to prompt the operator to select a menu may be displayed on the display device. Further, a GUI may be provided for facilitating the menu selection by means of a mouse or the like. The menus include data registration, a virtual combination operation, print, search, and system completion. Once one of those menus is selected, the program is shifted to perform processes for the selected menu. This step S2 covers an operation where the operator selects a menu by input, using a keyboard, a mouse or the like. When the processes for the selected menu are completed (return from a processing routine), except for system completion, post-processing is performed in a miscellaneous processing step S7 and the processing returns to the menu selection step S2.

Brief descriptions of processes selectable in the menu selection step S2 are provided below.

When data registration is selected, a data registration processing step S3 is performed. In the step S3, document data, input from the file input device 1, is received and the data is registered. Further, files already stored in the main storage devices and the auxiliary storage device may be automatically or manually registered as data in the system. Thereafter, the system recognizes the registered data as a document file. A registered document file can be shown to the operator as an icon indicating a document file on the display device.

When a virtual combination operation is selected, a virtual combination operation processing step S4 is performed. In the step S4, a variety of operations can be performed on a document in the document management apparatus 2, a virtual combination and an index. Detailed operations in the step S4 are described later.

When printing is selected, a print processing step S5 is performed. In the step S5, data of a managed document is transmitted to a printer and an MFP to perform a printing process. In the step S5, a process is performed which is basically the same as in the case of giving a printing command in a later-described virtual combination operation command processing step S43. It is to be noted that a process to perform transmission of document data to an FTP server or the like constituting the external system 3, a process to perform sending of a mail including document data to a mail server, or some other processes may be added to the step S5. It is also possible, naturally, to give menus for performing the document data transmitting process, the mail sending process and the like, separately from the printing menu, in line with the menus of the data registration, the virtual combination operation, the printing, and the like.

When search is selected, a search processing step S6 is performed. In the step S6, keywords, a markers and the like added to the document files are used for the search.

When system completion is selected, a system completion processing step S8 is performed. In the step S8, necessary post-processing and the like are performed to complete the present system. Thereafter, the program for the system is completed.

Among the five menus (the data registration, virtual combination operation, printing, search, system completion) shown in FIG. 4, the data registration, the search, and the system completion are common processes and thus are not directly relevant to the present invention. In the printing process S5, as described above, the process is performed which is basically the same as in the case where a printing command is issued in the virtual combination operation command processing step S43 which is included in the virtual combination operation processing step S4. Processes included in the printing process S5 other than the above process are common processes concerning printing. Accordingly, in the following, only the virtual combination operation process S4 is described in detail.

Figure 5:
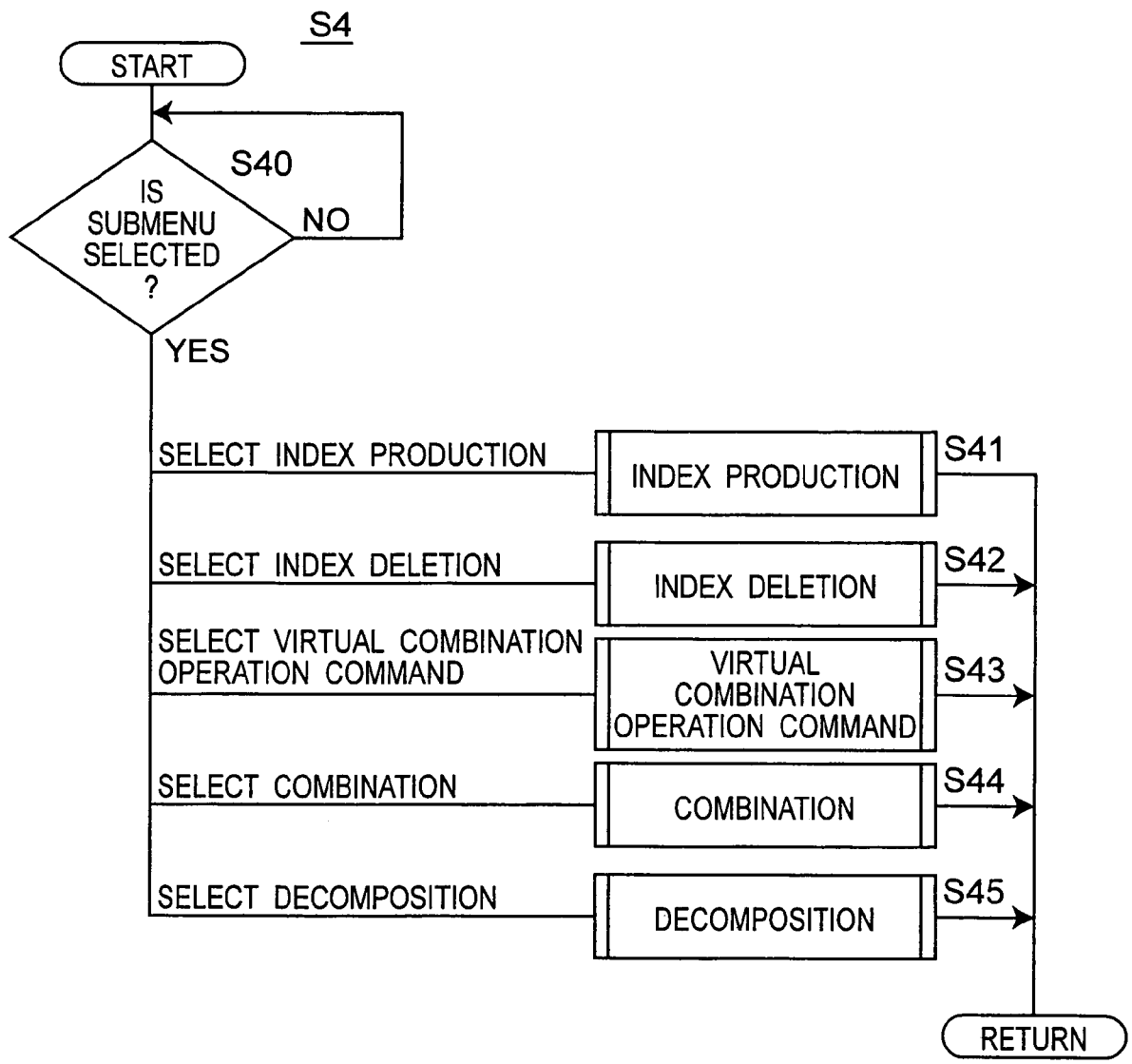
FIG. 5 is a flowchart of processing steps for a virtual combination operation.

FIG. 5 is a flowchart showing a virtual combination operation processing step S4 shown in FIG. 4.

When the virtual combination operation is selected from the menus, the step S4 is performed. First, a submenu selection step S40 is performed. This process remains in a wait state until the operator selects a submenu. The submenu selection may be made in the same manner as in the foregoing menu selection by the operator. Also as in the menu selection, a message or the like to prompt the operator to select a submenu may be displayed on the display device, and a GUI may be provided for facilitating the submenu selection by means of a mouse or the like.

The submenus include index production, index deletion, virtual combination operation command, combination and decomposition.

Those submenus are briefly described below.

In the index production, an index is set (inserted) in a virtual combination and a variety of setting is made on the inserted index.

In the index deletion, a selected index is deleted from a virtual combination.

In the virtual combination operation command, a variety of processes to perform on a virtual combination are commanded. The variety of processes is explained later with examples.

In the combination, a combination between virtual combinations, between document files, or between a virtual combination and a document file is performed. The combination between document files results in formation of a new virtual combination.

In the decomposition, a virtual combination is decomposed into a plurality of virtual combinations or document files in units of document files or indexes included in the virtual combination. An index included in the virtual combination before the decomposition can be included as it is in the new virtual combination formed by the decomposition.

Next, those submenus are specifically described with reference to flowcharts showing processes in the respective submenus (FIGS. 6 to 15), and example drawings (FIGS. 16 to 23).

<Index Production>

Figure 6:
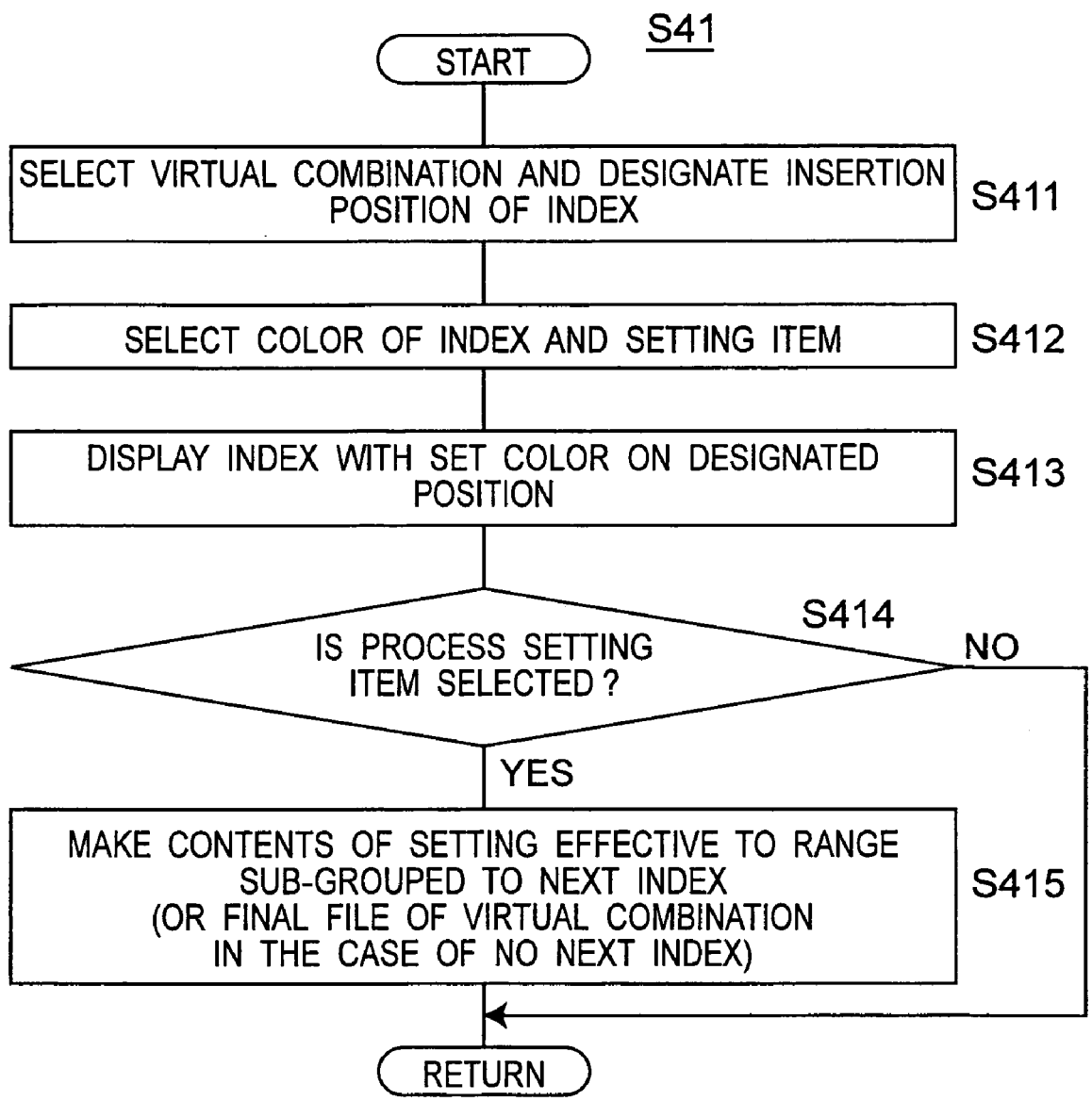
FIG. 6 is a flowchart of processing steps for index formation.

In the submenu selection step S40 (FIG. 5), when the index production is selected, an index production processing step S41 is performed. FIG. 6 shows detailed operations in the step S41 as a flowchart.

First, in a step S411, the operator selects a virtual combination in which an index is inserted, and designates an insertion position of the index in the virtual combination. Those selection and designation can for example be made in the following manner. A virtual combination displayed on the display device is selected by click with a mouse. The selection makes document files included in the virtual combination selectable. An insertion position of an index is then designated by clicking any one of the selectable document files. Further, a page in the document file may be designable as the insertion position.

Next, in a step S412, a color of the index and process setting items are selected. It is optional to select the process setting items, and hence they need not be selected unless necessary. The process setting items are later described in detail.

FIG. 16 shows an example of a mode of an index displayed on the display device.

Figure 16A:
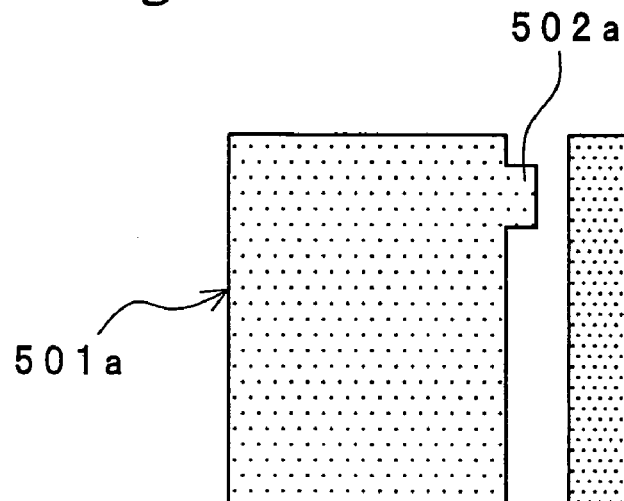
FIG. 16 is a diagram of an example of a mode of an index displayed on a display device.
Figure 16B:
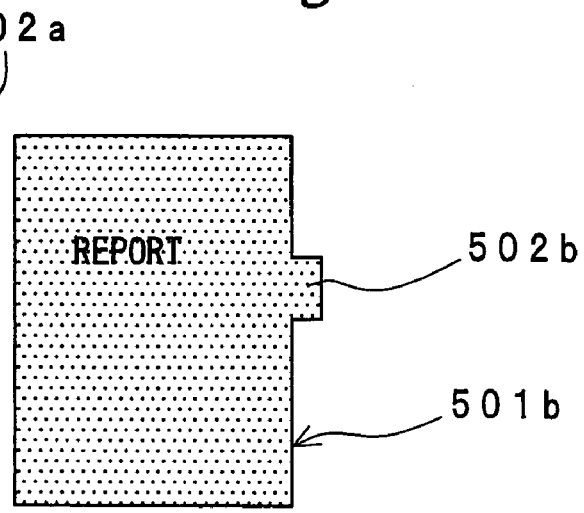
Figure 16C:
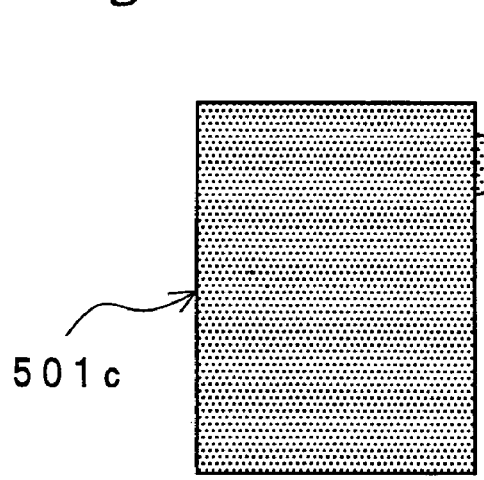
Figure 16D:
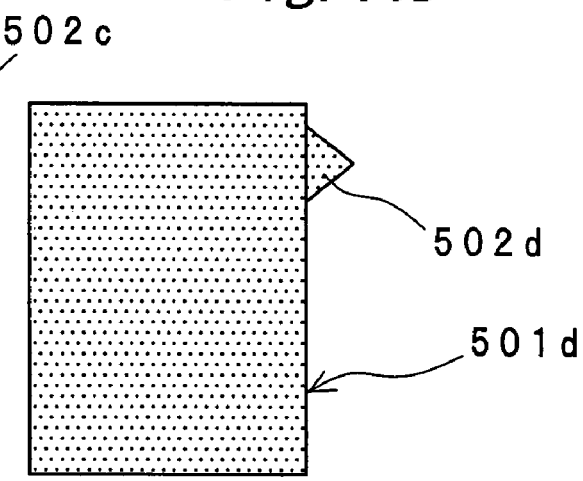

Indexes 501a to 501d are displayed in the form imitating index paper in reality on a display device. One side part of each of the respective displayed indexes is provided with tab parts 502a to 502d. Those tab parts may be positioned in consideration of the relationship with the tab parts of the other indexes included in the same virtual combination so as to be automatically changed and not to become invisible on the display device. Further, the form of each of the tab parts 502a to 502d is not limited to a rectangle, but can be in a variety of forms, including a half circle and a triangle. The indexes 501a to 501d are displayed by a color selected in the step S412. The index may be made translucent so that a first page of a document file positioned immediately under the index can be visually seen on a display device. Further, a comment may be allowed to be inputted in the step S412 according to need, thereby to allow the inputted comment to be displayed on the index 501*b* as shown in FIG. 16B.

The forgoing process setting items to be set to an index for example include: a security setting for setting security to a document file included in a subgroup defined by an index; a read-only setting for making a document file read-only, the document file being included in the subgroup defined by the index; a modification non-permitting setting for not permitting modification of a document file included in the subgroup defined by the index; a print non-permitting setting for not permitting printing of a document file included in the subgroup defined by the index; a display non-permitting setting for not permitting display of contents of a document file included in the subgroup defined by the index; a deletion non-permitting setting for not permitting deletion of a document file included in the subgroup defined by the index; a copy non-permitting setting for not permitting copying of a document file included in the subgroup defined by the index; a file-taking non-permitting setting for not permitting decomposition of a document file included in the subgroup defined by the index, from a virtual combination; a file-addition non-permitting setting for not permitting addition of a document file to the subgroup defined by the index; and a print setting applied at the time of printing a document file included in the subgroup defined by the index, such as setting of a page format, a paper type, and page margins, designation of double-sided printing and designation of 2-in-1 printing. The 2-in-1 printing is a printing method where two pages of a document are reduced into one page when printed.

Figure 17:
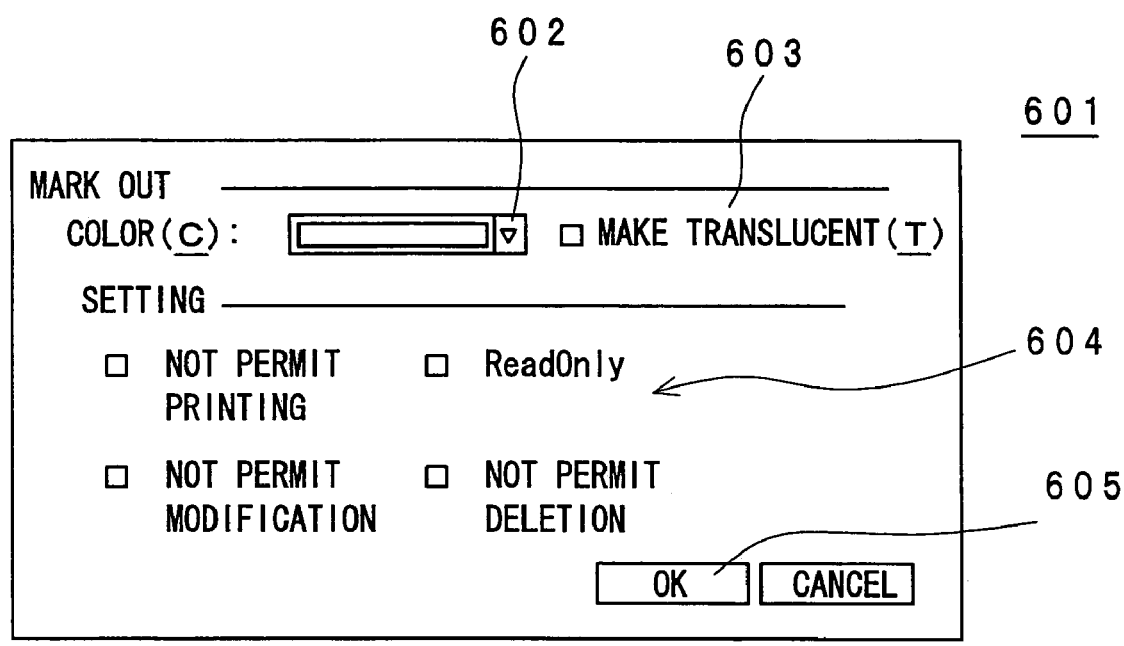
FIG. 17 is a diagram of an example of a process-setting screen to an index.

FIG. 17 shows an example of a screen for process setting to an index. In the upper part of a box 601 shown in FIG. 17, a pull-down menu 602 for selecting a display color of an index on the display device, as well as a check box 603 for selecting whether the index is made translucent or not, is displayed. The operator selects the color of the index as well as the translucence or opacity thereof, using a mouse.

In the lower part of a box 601 shown in FIG. 17, process setting items 604, which are selectable to be set to the index, are displayed. Although only the four items are displayed in this example for the sake of clarity of the drawing, all the process setting items described above may be displayed. The operator puts a check in the check box with a mouse to select the process setting item, and lastly pushes an OK button 605, to make the setting effective.

Next, in a step S413, an inserted state of the index designated in the step S412 is displayed on the insertion position designated in the step S411.

A virtual combination with an index inserted therein is displayed on the display device as shown in FIG. 18.

Figure 18A:
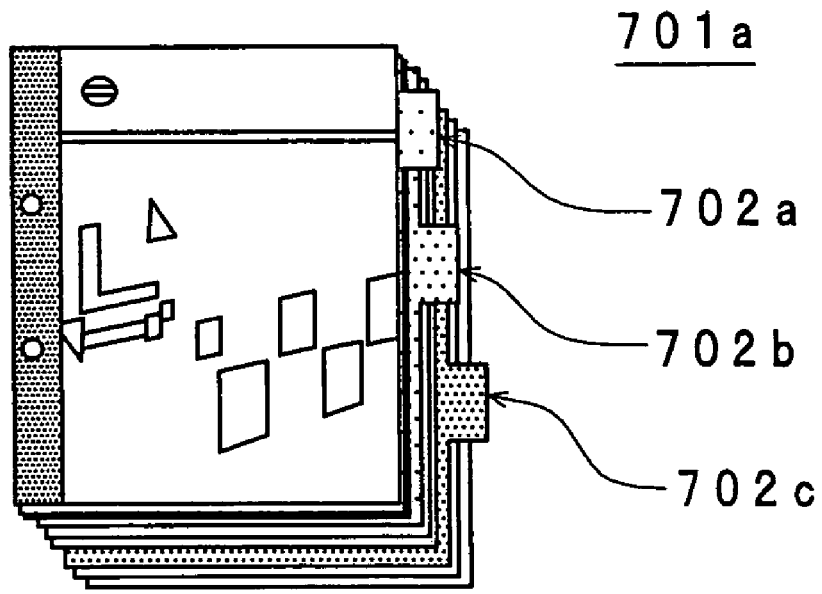
FIG. 18 is a diagram of an example of a display of a virtual combination with indexes inserted.
Figure 18B:
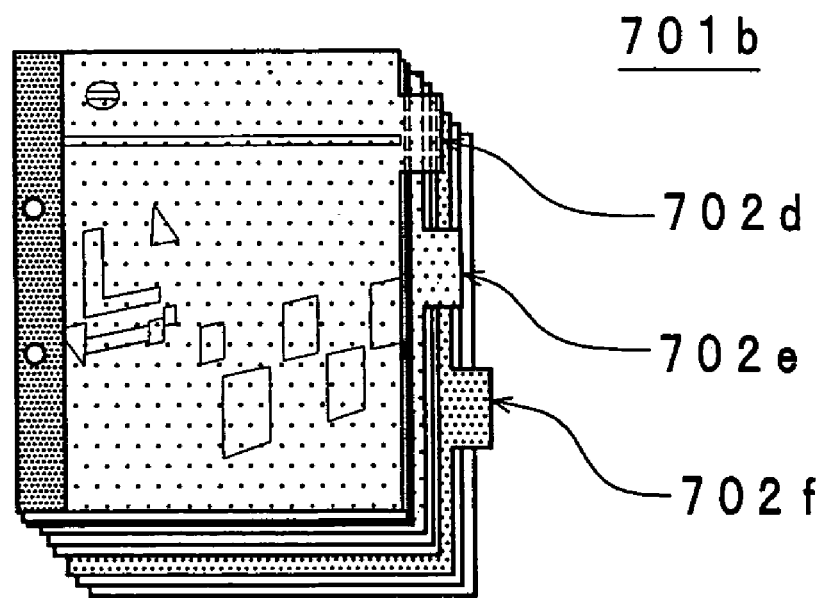

As shown in FIGS. 18A and 18B, a plurality of document files is integrated in virtual combinations 701*a* and 701*b*. Indexes 702*a* to 702*f* are inserted in the virtual combinations 701*a* and 702*b*, to sub-group part of the plurality of document files included therein. The indexes 702*a* to 702*f* are displayed by three different colors. Positions of the tab parts are adjusted in view of the visibility thereof and displayed.

FIG. 18B is the case of inserting the index 702*d* on the top page of the virtual combination 701*b*. Herein, the index may be automatically made translucent.

Next, in a step S414, it is determined whether one or more process setting items were selected in the step S412. When one or more process setting items were selected, the processing goes to a step S415. When no process setting item was selected, the processing returns.

In the step S415, the contexts of the selected process setting items, set to a sub-grouped range, are stored in the system (the data region in the index). The sub-grouped range is between the currently produced index and a next index (or the final file included in the virtual combination in the case where the currently produced index is the final index in the virtual combination). After the above storage, the processing returns. Processes relative to the contents of the process setting are also performed in the miscellaneous processing step S7 (FIG. 4).

<Index Deletion>

Figure 7:
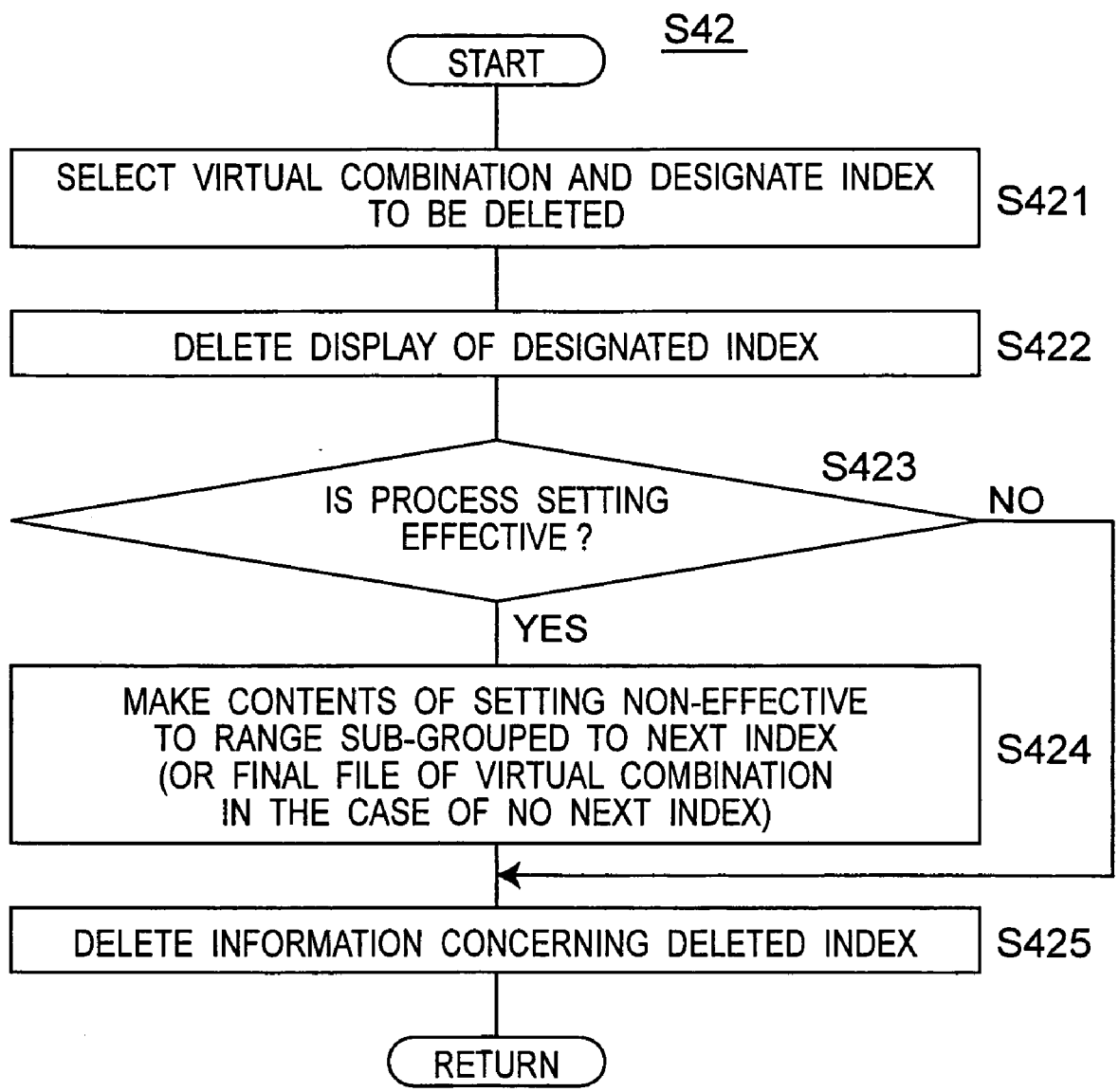
FIG. 7 is a flowchart of index deletion.
Figure 8:
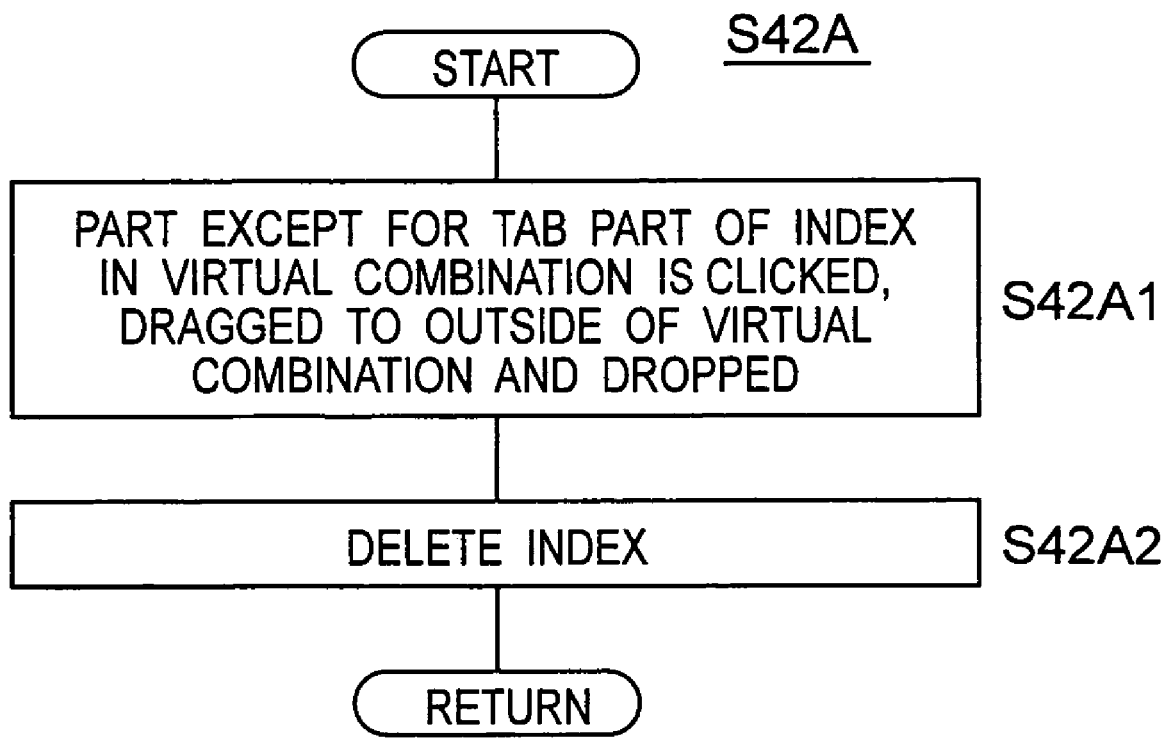
FIG. 8 is a flowchart of index deletion.

In the submenu selection step S40 in FIG. 5, when the index deletion is selected, an index deletion processing step S42 is performed. FIG. 7 shows detailed operations in the step S42 as a flowchart.

First, in a step S421, the operator selects a virtual combination including an index to be deleted, and designates the index to be deleted. It may be possible to designate an index to be deleted by direct selection of this index, instead of making the above two-step selection.

Next, in a step S422, a process is performed in which the display concerning the designated index is deleted from the display screen of the virtual combination on the display device.

Next, in a step S423, it is determined whether any process setting item has been effective to the designated index, by reference to information stored in the system. When any process setting item is determined to be effective, the processing goes to a step S424. When no process setting item is determined to be effective, the processing goes to a step S425.

In the step S424, a process is performed in which the contexts of the selected process setting items, being effective to a sub-grouped range, are made non-effective, and this change is stored in the system. The sub-grouped range is between the index designated to delete and a next index (or the final file included in the virtual combination in the case where the index designated to delete is the final index in the virtual combination).

Next, in the step S425, a process is performed in which the information concerning the index designated to delete is deleted from the system. After the deletion, the processing returns.

<Index Deletion (Modification Example of Deletion Process)>

It is to be noted that the following process may be constructed. Using a mouse as a pointing device, a part except for a tab part of an index, displayed on the display device, is dragged and then dropped in the outside of a virtual combination on the display device, thereby deleting the dragged and dropped index.

By selection of the virtual combination using the mouse, it is possible from this time forward to display any given page on the top of the virtual combination by means of a keyboard or a mouse. An index required to be deleted is deleted by displaying the index on the top, clicking a part except for the tab part of the index, and dragging it to the outside of the virtual combination to be dropped. FOG. 9 shows the flowchart of this process.

In a step S42A1, a part except for a tab part of an index in a virtual combination is clicked. The clicked part is then dragged to the outside of the virtual combination to be dropped, and the processing goes to a step S42A2.

In the step S42A2, a process for deleting the index is performed. This process may be the same as the process in the steps S422 to S425 in FIG. 7. After the deletion, the processing returns.

<Virtual Combination Operation Command>

Figure 9:
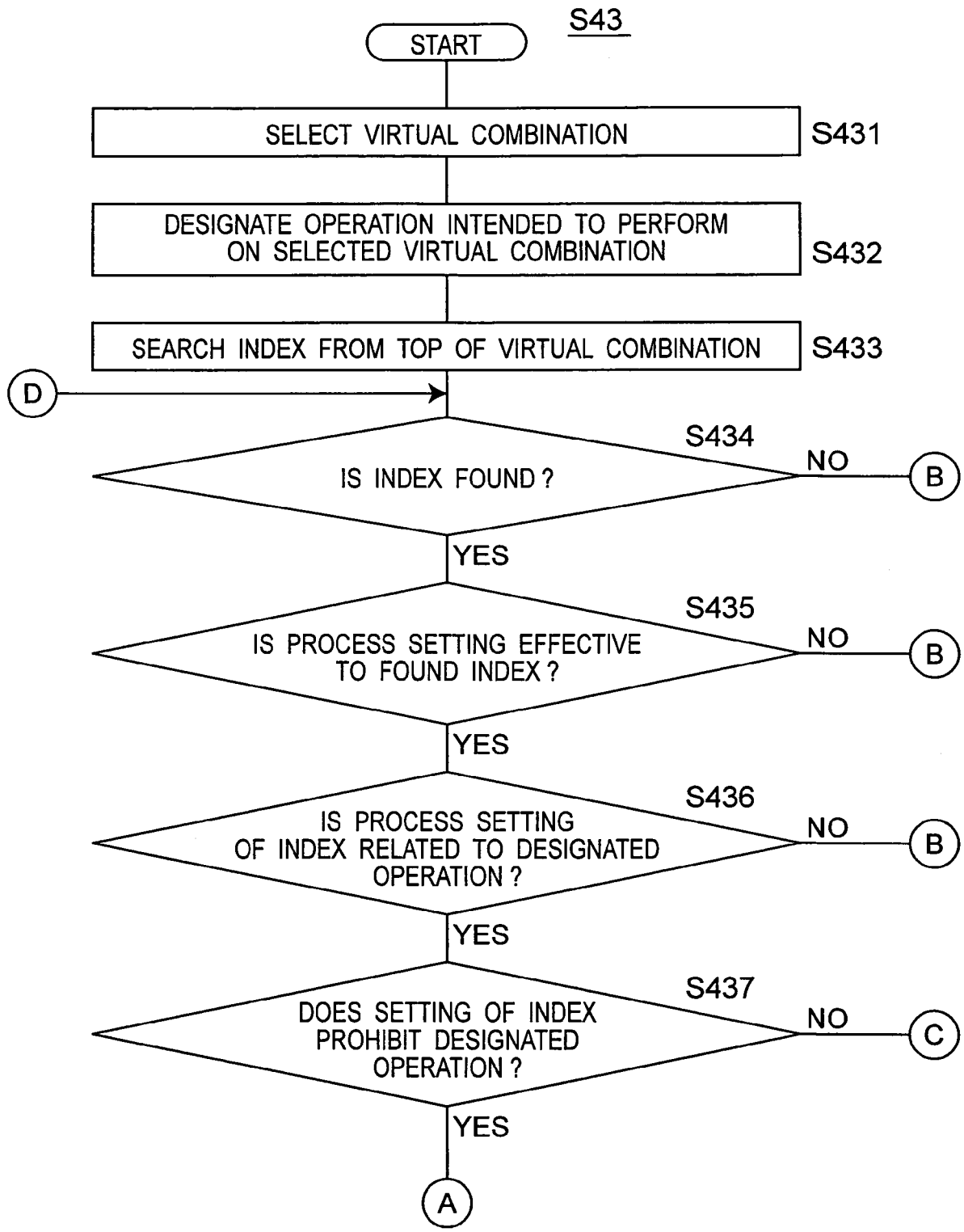
FIG. 9 is a flowchart of a virtual combination operation command.
Figure 10:
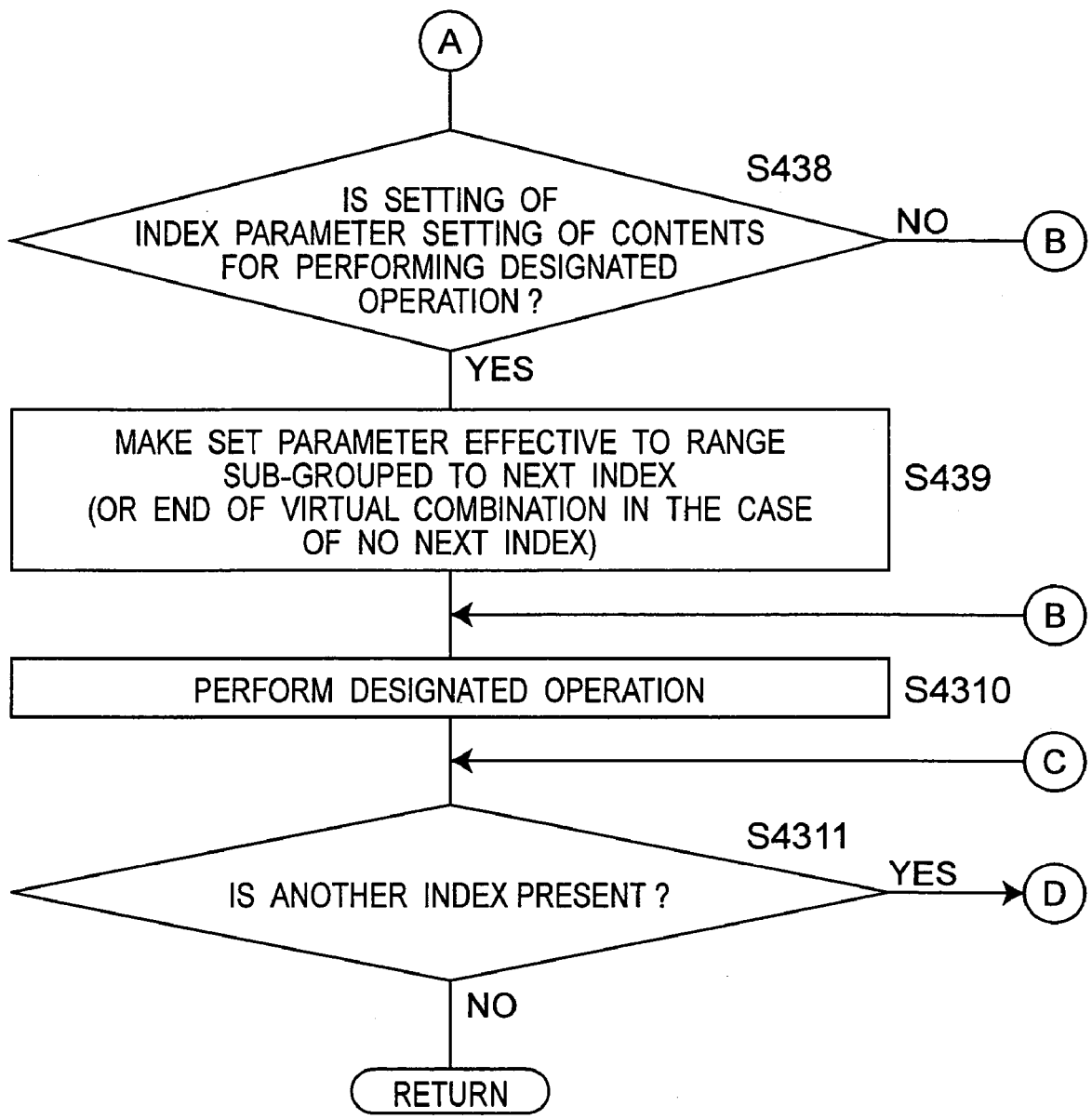
FIG. 10 is a flowchart of a virtual combination operation command.
Figure 11:
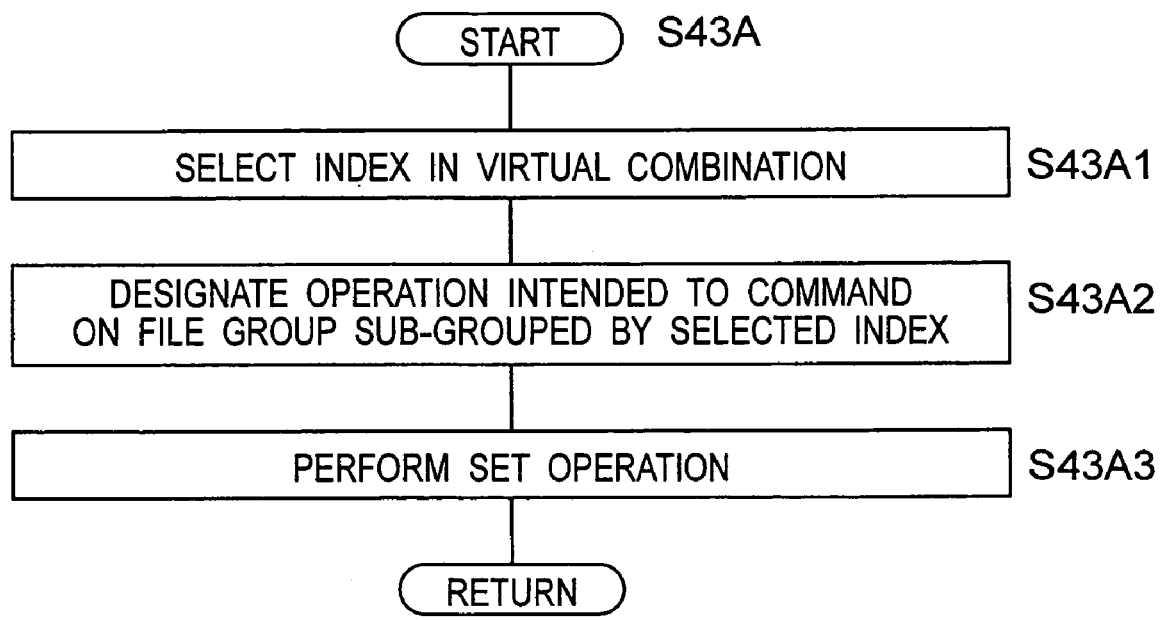
FIG. 11 is a flowchart of an index operation command.

When the operator wants to perform an operation on a virtual combination (e.g. display and read a document file included in a virtual combination, print a document file included in a virtual combination, etc.), the operator selects the virtual combination operation command in the submenu selection step S40 (FIG. 5). The system performs a process step S43 for a virtual combination operation command. FIGS. 9 and 10 show detailed operations in the step S43 as a flowchart.

First, in a step S431, a virtual combination on which an operation is intended to perform is selected. The selection may be made for example by clicking with a mouse the virtual combination displayed on the display device.

Next, in a step S432, the contents of the operation intended to perform are selected. The selection may be realized by a method convenient for the operator, using the mouse or the like and the GUI.

Next, in a step S433, an index having been inserted in the virtual combination is searched from the top page toward the final page of the selected virtual combination. At the time when the index is found, the processing goes to a step S433. When the index is not found after the search toward the final page, the processing also goes to the step S433.

Next, in the step S434, the result of the step S433 is referenced. When the index has been found, the processing goes to a step S435. When the index has not been found, the processing goes to a step S4310. The step S4310 is later described.

Next, in the step S435, it is determined whether any of the process setting items of the index found in the step S433 has been effective or not. When at least one of those process setting items has been effective, the processing goes to a step S436. When none of those process setting items has been effective, the processing goes to the step S4310.

Next, in the step S436, it is determined whether or not an operation to be performed according to the effective process setting item is related to the operation intended to perform. In the case where the operator intends to read a document file, for example, it is determined whether the process setting items concerning display has been effective or not. In the case where the operator intends to print a document file, for example, it is determined whether the process setting items concerning printing has been effective or not. When the related item is determined to be effective, the processing goes to a step S437. When the related item is determined not to be effective, the processing goes to the step S4310.

Next, in the step S437, it is determined whether or not the contents of the effective process setting item are to prohibit the operation intended to perform. When the contents are not to prohibit the operation, the processing goes to a step S438. When the contents are to prohibit the operation intended to perform, the processing goes to a step S4311. The step S4311 is later described.

FIG. 10 shows a flowchart concerning the step 438 and steps thereafter.

Next, in the step S438, it is determined whether or not the setting of the effective process setting item relates to a parameter relevant to the operation intended to perform. In the case where a document file is intended to print, for example, it is determined whether settings made at the time of printing have been effective or not. When the setting concerning a parameter relevant to the operation intended to perform is determined to be effective, the processing goes to a step S439. Otherwise, the processing goes to the step S4310.

Next, in the step S439, a process is performed in which the set parameter is made effective to a sub-grouped range to a next index (or the final file included in the virtual combination in the case where the index is the final index in the virtual combination), and this change is stored in the system. When no change is made on the parameter, naturally, the parameter setting remains in a prescribed standard state. This standard state may be set by initialization of the parameter setting at the time of system activation.

Next, in the step S4310, the parameter or the like stored in the system is referenced, and the designated operation is performed. When the index was found by performing the previous step S434, in the step S4310, the designated operation is performed so far as on files sub-grouped by the found index.

Next, in the step S4311, it is determined whether an index is present or absent subsequently to the index that was found by performing the previous step S434, in the virtual combination. When a subsequent index is determined to be present, the processing goes to the step S434. When it is determined to be absent, the processing returns.

As thus described, with the constitution of the process for a virtual combination operation command, when the print non-permitting setting has been effective to an index, for example, a document file sub-grouped by this index is not printed in printing a virtual combination. Further, when the display non-permitting setting has been effective to an index, for example, a document file sub-grouped by this index is not displayed even in reading contents of a virtual combination. Moreover, when the setting at the time of printing (double-sided printing, 2-in-1 printing, etc.) have been effective to an index, for example, a document file sub-grouped by this index is printed using this setting at the time of printing. The other process setting items act in the same manner.

<Index Operation Command (Modification Example of Virtual Combination Operation Command)>

In the step S431, a virtual combination on which an operation is intended to perform was selected. Herein, selection of a specific index included in the virtual combination may be allowed. The selection of an index may be made for example by clicking with a mouse the tab part of an index displayed on the display device. Upon selection of an index, processes may be performed according to the flowchart shown in FIG. 11. It is possible to collectively perform a process on the document files included in the subgroup by setting the process in the index object with the subgroup bound up.

Figure 19:
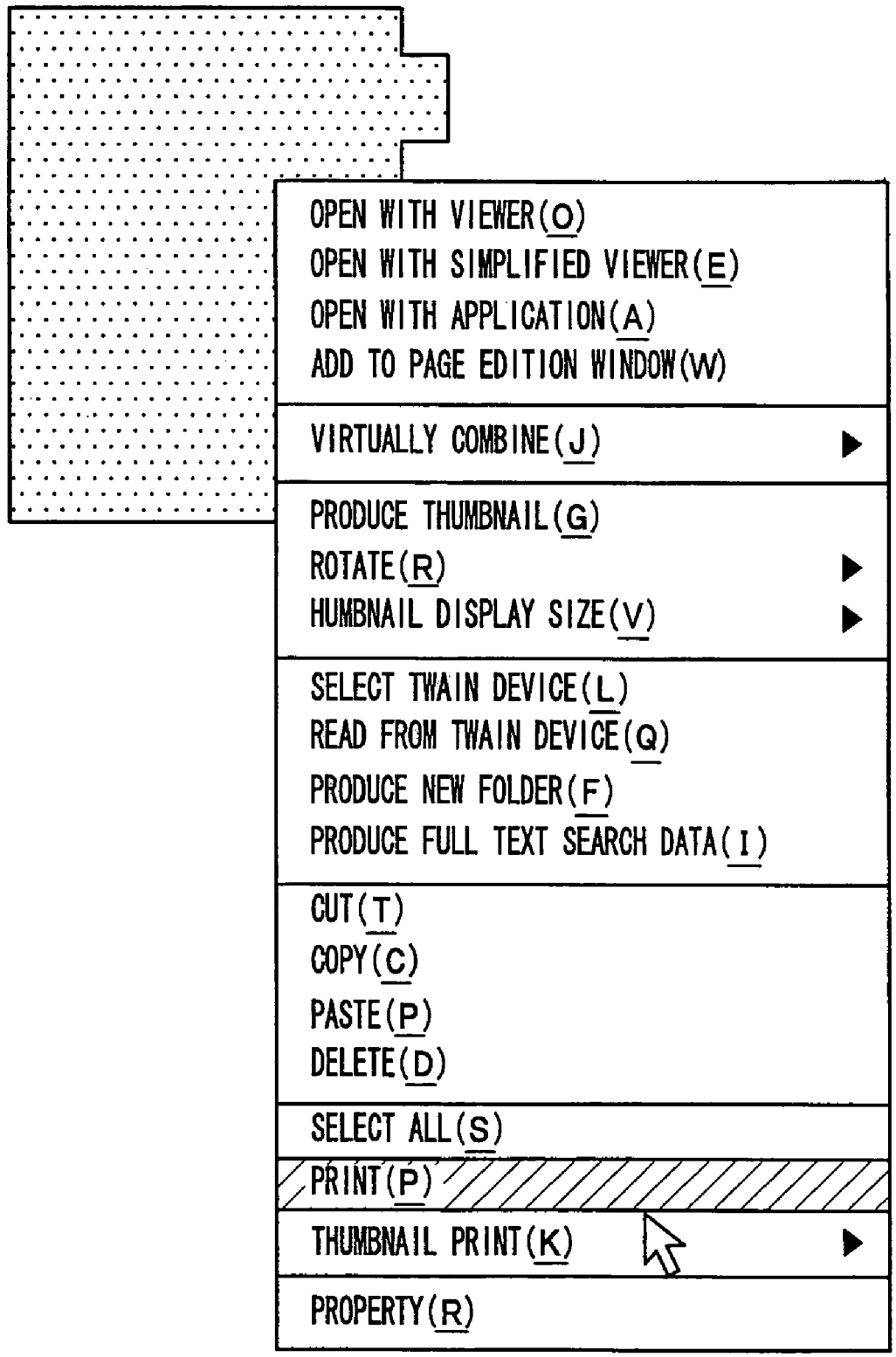
FIG. 19 is a diagram of a context menu to be displayed on the display device in the index operation command.

In a step S43A1, an index is selected. Next, in a step S43A2, an operation intended to perform on a document file group, sub-grouped by the selected index, is designated. The designation may be realized by a method convenient for the operator, as in the step S432, such as a method of displaying menus or a tool button group of operations performable on the index, or a method of operating a context menu displayed by click with a mouse (e.g. a right click) (FIG. 19).

Figure 20:
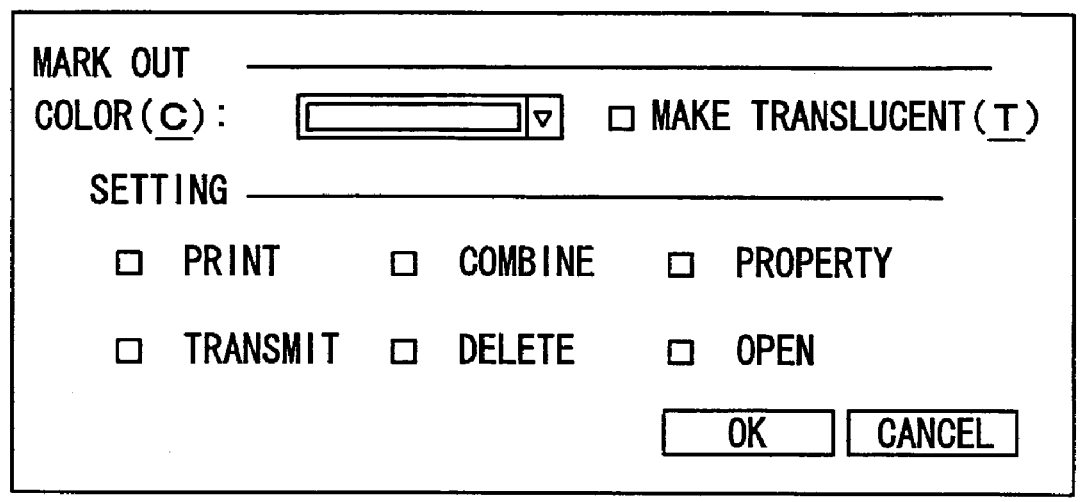
FIG. 20 is a diagram of an example of a box for selecting an operation command button to be displayed on an index.
Figure 21:
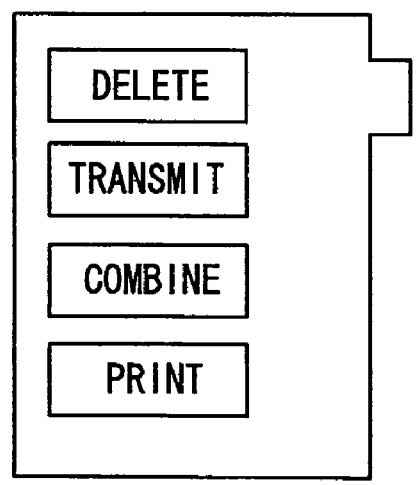
FIG. 21 is a diagram of an operation command button to be displayed on an index.

Further, in the index production process S41, producing a button on an index may be allowed. In the step S412 (FIG. 6), selecting an operation command button to be displayed on the index may be allowed. For example, when a box as shown in FIG. 20 is displayed and operation command items required to display with buttons are checked, operation command buttons as shown in FIG. 21 are displayed on an index. The operator can click the button to designate an operation intended to perform. In this case, naturally, at the time of selecting the index in the step S43A1 (FIG. 11), the display state on the display device is changed such that the selected index is displayed at the front and the buttons registered in the index are visible on the display device.

Next, in a step S43A3, the operation designated by the step S43A2 is performed. This process may be the same as the process in the steps S435 to S4310 in FIG. 9. After this performance, the processing returns.

<Combination>

Figure 12:
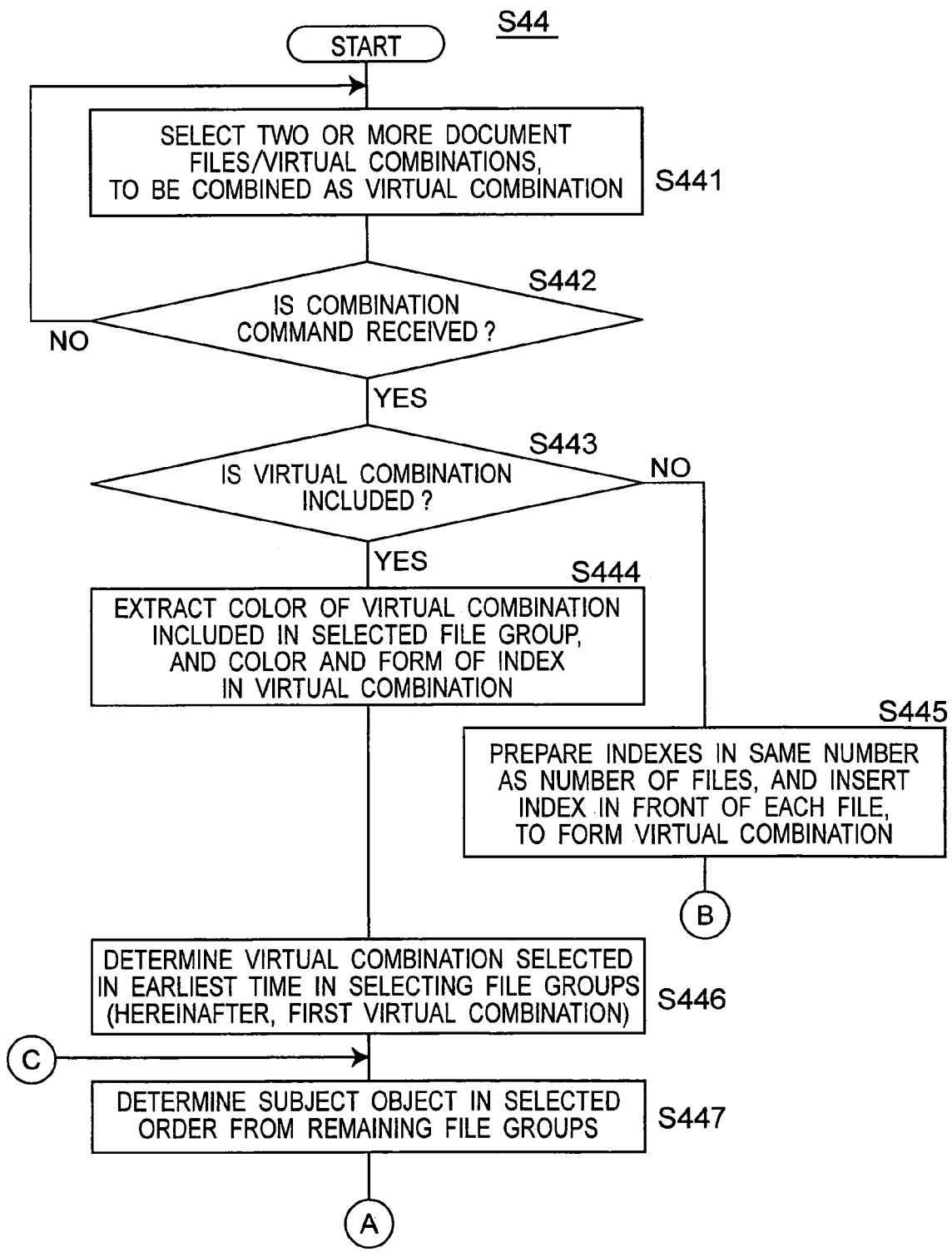
FIG. 12 is a flowchart of combination.
Figure 13:
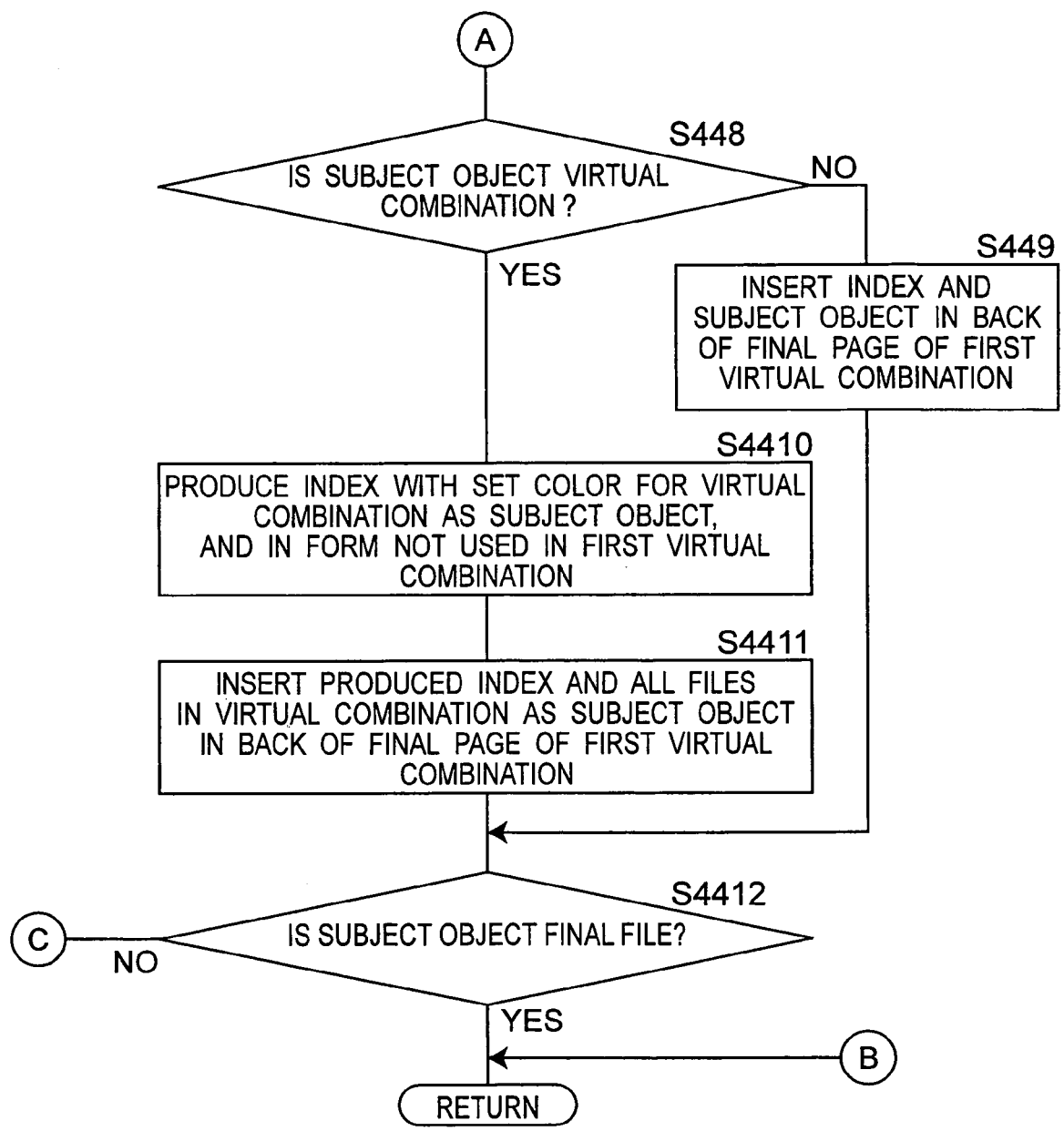
FIG. 13 is a flowchart of combination.

In the submenu selection step S40 (FIG. 5), when the combination is selected, a combination processing step S44 is performed. FIGS. 12 and 13 show detailed operations in the step S44 as flowcharts.

First, in a step S441, the operator selects two or more document files or virtual combinations from document files and virtual combination integrated in one virtual combination. The selection may be made by sequentially clicking, with a mouse or the like, document files or virtual combinations which are displayed on the display device. The system stores the selected document files or virtual combinations, along with the order of choice.

In a step S442, it is determined whether a combination command has been issued or not. The combination command is for example a command issued by the operator by clicking with a mouse a combination command button displayed on the display device. Until the issue of this command, the system accepts the selection in the step S441. When the combination command is issued, the processing goes to a step S443.

Next, in the step S443, it is determined whether the document files or the virtual combinations selected in the step S441 include one or more virtual combinations. When one or more combinations are determined to be included, the processing goes to a step S444. Otherwise, the step goes to a step S445.

When the processing goes to the step S444, the color of the virtual combination selected in the step S441 (the color of the virtual combination here refers to the color of the binding margin of the binder displayed on the display device for showing the virtual combination) and the color of the index included in the virtual combination and the form of the tab part thereof are extracted. After the extraction, the processing goes to the step S446.

When the processing goes from the step S443 to the step S445, indexes in the same number as the number of the document files selected in the step S441 are prepared to form a virtual combination where each index is inserted in front of each document file, and the processing then returns. The prepared indexes may have different colors or the same color, and may have the tab parts in different forms or the same form. When only one document file is selected, a virtual combination including the selected document file and one index is formed.

Next, in the step S446, a virtual combination, selected in the earliest time (hereinafter referred to as a first virtual combination) among the document files and the virtual combinations selected in the step S441, is determined.

Next, in a step S447, one document file or one virtual combination (hereinafter referred to as an subject object) is selected in the order selected in the step S441, (except for the first virtual combination). In the step S447, from the next time on, a target object is selected one by one according to the order selected in the steps S441.

FIG. 13 shows a flowchart concerning the step 448 and steps thereafter.

Next, in a step S448, it is determined whether the subject object is a virtual combination or not. When the subject object is a virtual combination, the processing goes to a step S4410. Otherwise, the processing goes to a step S449.

When the processing goes from the step S448 to the step S449, an index is added in front of the top of the document file as the subject object, which is inserted in the back of the final page of the first virtual combination, and the processing goes to a step S4412. The step S4412 is later described.

When the processing goes from the step S448 to the step 4410, an index is produced in the step S4410. This index is displayed by the color set as the color of the virtual combination as the subject object and also has a tab part in the form not used in the first virtual combination. Further, when the color set as the color of the virtual combination as the subject object has already been used to display another index, the color of the index may be different from the color of the virtual combination as the subject object. That is to say, the index may be displayed by a different color or has a tab part in a different form from those already in use, thereby to improve visibility of the index.

Next, in a step S4411, the index produced in the step S4410 is added in front of the top of the document file and index included in the virtual combination as the subject object, and those document file and index are inserted in the back of the final page of the first virtual combination, and the processing goes to the step S4412.

Next, in the step S4412, it is determined whether or not the document file or the virtual combination as the current subject object is the document file or the virtual combination lastly selected among the document files or the virtual combinations in the step S441. When the subject object is determined to be the document file or the virtual combination lastly selected in the step S441, the processing returns. Otherwise, the processing goes to the step 447.

As thus described, with the constitution of the combination process, it is for example possible to combine a virtual combination 801a and a virtual combination 801b to form a new virtual combination 802, as shown in FIG. 22. In this example, the virtual combination 801a is firstly selected, and the virtual combination 801b is secondly selected. With such selections, in the virtual combination 802, an index 803 with the same color as the color of the virtual combination 801b is inserted immediately after the final page of the document file included in the virtual combination 801a, and in the back of the index 803, the document file included in the virtual combination 801b is inserted.

When a plurality of virtual combination objects is combined to form one new virtual combination object, the original virtual combination object is automatically sub-grouped by the index object. This can make it easier for an operator to recognize the ranges of the original virtual combinations even after the combination of the plurality of virtual combinations.

<Decomposition>

Figure 14:
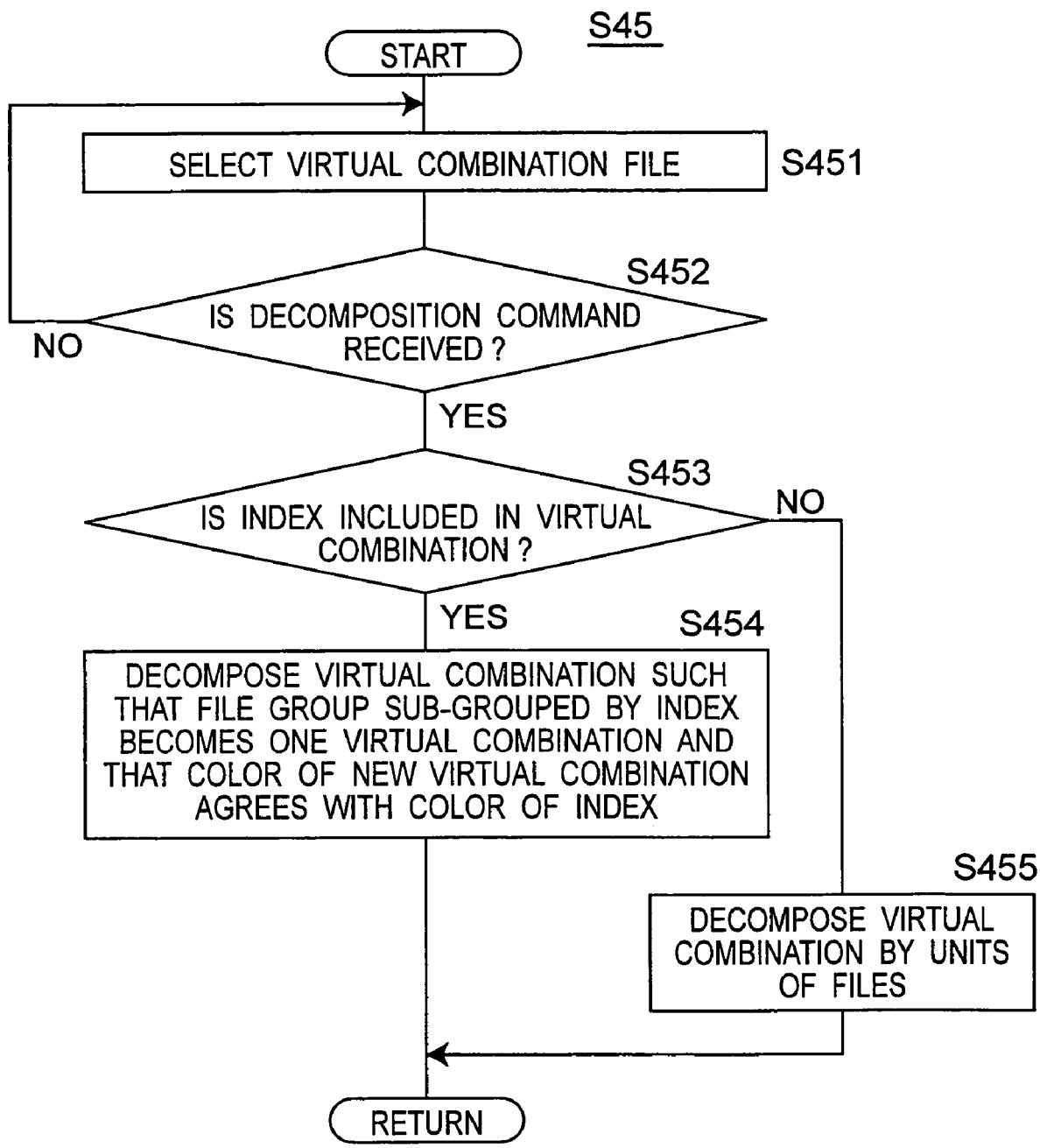
FIG. 14 is a flowchart of decomposition.

In the case of decomposing a virtual combination into a plurality of virtual combinations, the decomposition is selected in the submenu selection step S40 (FIG. 5). Accordingly, the system performs a decomposition processing step S45. FIG. 14 shows detailed operations in the step S45 as a flowchart.

First, in a step S451, the operator selects a virtual combination intended to decompose. In this step, selecting a plurality of virtual combination intended to decompose may be allowed.

In a step S452, it is determined whether a decomposition command is issued or not. The decomposition command is for example a command issued by the operator by clicking with a mouse a decomposition command button displayed on the display device. Until the issue of this command, the system accepts the selection in the step S451. When the decomposition command is issued, the processing goes to a step S453.

Next, in the step S453, it is determined whether an index is included in the selected virtual combination or not. When inclusion of an index is determined, the processing goes to a step S454. When no inclusion of an index is determined, the processing goes to a step S455. When a plurality of virtual combinations are selected in the step S451, the processes in the steps S435, S454 and S455 are performed separately on each of the virtual combinations selected in the step S451.

When the processing goes from the step S453 to the step S454, in the step S454, the virtual combination is decomposed into a plurality of virtual combinations such that a document file group, sub-grouped by an index, becomes one virtual combination. Herein, a color of a newly formed virtual combination may be made to agree with the color of the index included in the original virtual combination.

When the processing goes from the step S453 to the step S455, the virtual combination is decomposed into virtual combinations by units of document files included in the original virtual combination.

As thus described, with the constitution of the decomposition process, it is for example possible to form a virtual combinations 903a, 903b, 903c and 903d by decomposing a virtual combination 901 including indexes 902a, 902b and 903c as shown in FIG. 23. Herein, the document file group which was positioned at the front of the original virtual combination becomes the virtual combination 903a, and the color thereof agrees with the color of the original virtual combination. The document file groups sub-grouped by the indexes 902a, 902b and 902c are respectively included in the virtual combinations 903b, 903c and 903d, and the colors of those original indexes respectively agree with the colors of those virtual combinations.

<Index Decomposition (Modification Example of Decomposition Process)>

It is to be noted that the following process may be constructed. Using a mouse as a pointing device, a tab part of an index, displayed on the display device, is dragged and then dropped in the outside of a virtual combination on the display device, thereby forming a new virtual combination including document files having been sub-grouped by the dragged and dropped index.

Figure 15:
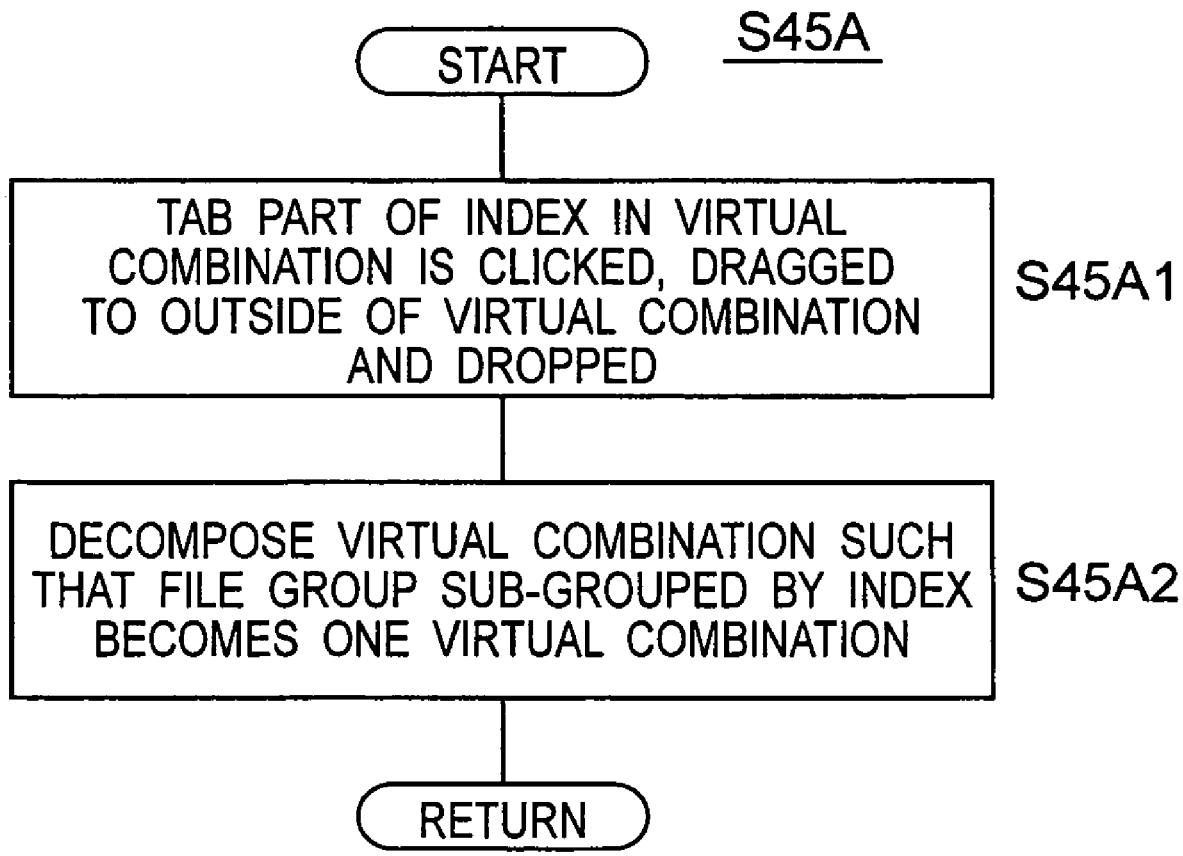
FIG. 15 is a flowchart of decomposition.

FIG. 15 shows the flowchart of this process. In a step S45A1, a tab part of an index in a virtual combination is clicked. The clicked part is then dragged to the outside of the virtual combination to be dropped, and the processing goes to a step S45A2.

In the step S45A2, each of document file groups having been sub-grouped by indexes is decomposed from the virtual combination, to become one virtual combination. This process may be the same as in the step S454 in FIG. 14. After this decomposition, the processing returns.

It is possible to separate the index object from the virtual combination object to create a new virtual combination object from the as-separated index object. Therefore It is possible to simply perform an operation for dividing the virtual combination object into a plurality of virtual combination objects.

<Further Examples of Display of the Virtual Combination Objects and Indexes>

As described above, the virtual combination object and index object have the forms on the display, for example, as shown in FIG. 18 and FIG. 16, respectively. Here, further examples of display of the virtual combination objects and index objects other than those shown in FIG. 18 or FIG. 16.

FIG. 24 shows examples of display of the virtual combination objects. In these examples of display, the virtual combinations 911a to 911c are displayed by three-dimensional forms having gores of scroops as if they were binders in real-world. The difference of height of the virtual combination objects 911a to 911c on display depends on the total number of pages including each virtual combination 911a, 911b, or 911c. As shown in FIG. 24A to 24C, for example, the virtual combination is displayed varying its height by three levels, thick, normal, and thin.

Figure 25A:
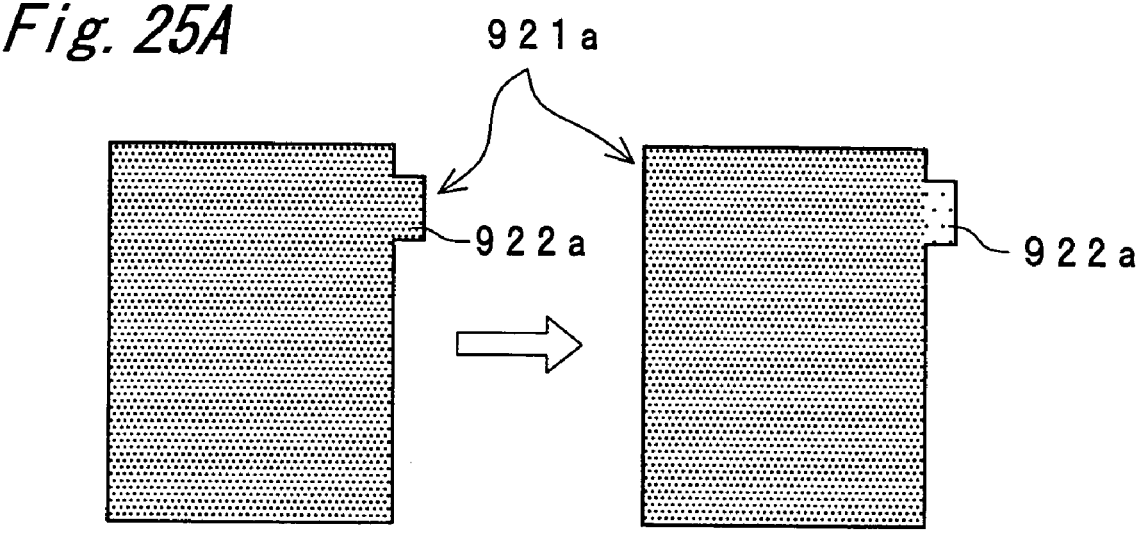
FIG. 25 is a diagram of further examples of displays of indexes.
Figure 25B:
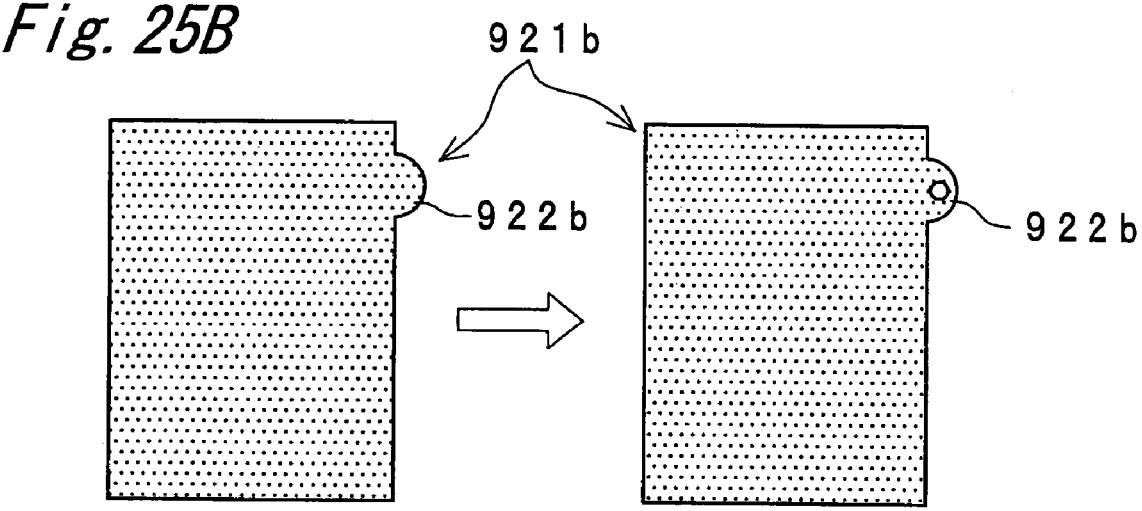
Figure 25C:
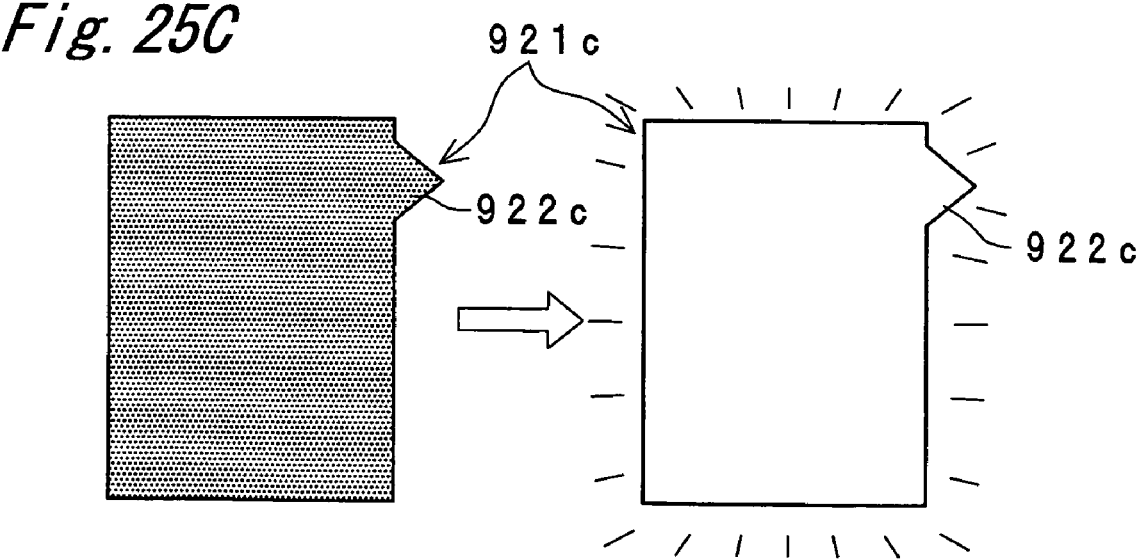

FIG. 25 shows examples of display of the index objects. In FIGS. 25A to 25C, the indexes are shown on the left side, which are not set any effective setting for processing and any parameters for process settings, respectively. And on the right side, the indexes are shown which are set at least one effective setting or at least one parameter for process setting. In these examples, some artifices are made to be easily recognized by the operator whether the indexes are set any effective setting for processing or any parameters for process setting or not. In FIG. 25A, the tab part 922a of the index 921a changes its color to a color not agree with the color of the body of the index when set any effective settings for processing or parameters for process settings. This change of the color of the tab part 922a indicates that some settings for processing or some parameters for process settings are effective, for example. In FIG. 25B, a symbol ("o" in this example) is shown on the tab part 922b of the index 921b, when set any effective settings for processing or parameters for process settings, for example. Further, in FIG. 25C, the index 921c flashes on and off repeatedly, when the index is set any effective settings for processing or parameters for process settings, for example. Thus, making artifices on the conformation for displaying the index elevates the operationality. Therefore, further improvement on operating efficiency is expected.

In the document management apparatus according to the present invention, it is possible to group a plurality of document files, which are virtually combined by a virtually combined object, into sub-groups by index objects. Accordingly, the present invention is effective as a document management apparatus capable of simple and integrated management and processing of a plurality of document files converted into electronic data.

While the embodiment of the present invention, as herein disclosed, constitutes a preferred form, it is to be understood that other forms might be adopted.

What is claimed is:

1. An apparatus for managing electronically recorded document files, comprising:
   an input device for inputting by an operator;
   a virtual combination editor for editing a virtual combination object based on the information inputted in said input device, the virtual combination object denoting an object that has a first data region and virtually combining document files, wherein the first data region includes information for managing the document files to be virtually combined, including an order relation between the document files, and a setting position of the index object to be set immediately before or immediately after the virtually combined document file, or immediately before or immediately after a page constituting the document file;
   an index editor for editing an index object based on the information inputted in said input device, the index object denoting an object that has a second data region and manages at lest one or more document files included in the document files virtually combined by the virtual combination object or one or more pages constituting the document file, as a subgroup in the virtual combination object, wherein the second data region includes information on setting for processing the subgroup and a parameter according to the process setting; and a document file manager for managing and processing the document files based on information recorded in the virtual combination object and information recorded in the index object.

2. The apparatus according to claim 1, wherein said virtual combination editor edits the virtual combination object to create or delete the virtual combination object, combine or unbind the document files to or from the virtual combination object, and set or reset an index object.

3. The apparatus according to claim 1, wherein said document file manager further manages and processes the document files based on the information inputted in said input device.

4. The apparatus according to claim 1, wherein the apparatus further comprises a display device for displaying a state of document file management, including information on one or more document files, one or more pages included in the document files, one or more virtual combination objects, and one or more index objects.

5. The apparatus according to claim 1,
wherein, when the index object is set in the virtual combination object by said virtual combination editor, said display device displays the setting of the index object in between the document files virtually combined to the virtual combination object or between pages of the document file, and when the index object, set in the virtual combination object by said virtual combination editor, is deleted, said display device deletes the index object, displayed as being set in between the document files virtually combined to the virtual combination object or between the pages of the document file.

6. The apparatus according to claim 1, wherein the document file or document files or the page or pages in the document file, to be virtually sub-grouped by the index object, are determined by the position of the index object in the virtual combination object, which is set by said virtual combination editor, and are included between the position and a second index object set subsequently to the index object, and when the second index object is not set, the document file or document files or a page or pages in the document file, included in between the position and a final page in the document file included in the end of the virtual combination, are included in the subgroup.

7. The apparatus according to claim 1, wherein upon receipt of an operation command in units of index objects from said input device, the document file manager performs an operation, included in operations commanded by the operation command, on the document file or document files or a page or pages in the document file which are included in the subgroup defined by the index object.

8. The apparatus according to claim 1,
wherein when said virtual combination editor virtually combines the virtual combination objects or the document files to create a second virtual combination object, said virtual combination editor automatically sets the index object indicating a boundary of the document files or the virtual combination objects before the combination, which will be virtually combined to the second virtual combination object.

9. The apparatus according to claim 1, wherein said virtual combination editor decomposes the virtual combination of the virtual combination object to create the document file or document files not virtually combined by the virtual combination object or create a new virtual combination object or new virtual combination objects in which at least part of the document files are virtually combined.

10. The apparatus according to claim 1,
wherein the index object has the form of index paper with the tab part, when displayed on said display device, and, using a pointing device to serve as said input device, the tab part of the index object, displayed on said display device, is dragged and then dropped in the outside of the virtual combination object displayed on said display device, whereby said virtual combination editor creates a new virtual combination object where the document files having been sub-grouped by the index object are virtually combined, and a display color of the new virtual combination object on said display device is set to agree with a display color of the dragged index object on said display device.

11. The apparatus according to claim 1,
wherein the index object has the form of index paper with the tab part, when displayed on said display device, and, using a pointing device to serve as said input device, a part except for the tab part of the index object, displayed on said display device, is dragged and then dropped in the outside of the virtual combination object displayed on said display device, whereby said virtual combination editor deletes the dragged and dropped index object.

12. A method for managing electronically recorded document files, comprising the steps of
editing a virtual combination object based on information inputted in an input device, the virtual combination object denoting an object that has a first data region and virtually combining document files, wherein the first data region includes information for managing the document files to be virtually combined, including an order relation between the document files, and a setting position of the index object to be set immediately before or immediately after the virtually combined document file, or immediately before or immediately after a page constituting the document file; and editing an index object based on the information inputted in the input device, the index object denoting an object that has a second data region and manages at least one or more document files included in the document files virtually combined by the virtual combination object or one or more pages constituting the document file, as a subgroup in the virtual combination object, wherein the second data region includes information on setting for processing the subgroup and a parameter according to the process setting.

13. The method according to claim 12, wherein said virtual combination object editing step edits the virtual combination object to create or delete the virtual combination, combine a document file to the virtual combination or reset this combination, and set the index object or reset this setting.

14. A computer executable program stored on a computer-readable storage medium and configured to make a computer manage electronically recorded document files, the program comprising instructions for performing the steps of:
a step for inputting information by an operator;
a step for editing a virtual combination object based on the information inputted in said input step, the virtual combination object denoting an object that has a first data region and virtually combining document files, wherein the first data region includes information for managing the document files to be virtually combined, including an order relation between the document files, and a setting position of the index object to be set immediately before or immediately after the virtually combined document file, or immediately before or immediately after a page constituting the document file;

a step for editing an index object based on the information inputted in said input step, the index object denoting an object that has a second data region and manages at least one or more document files included in the document files virtually combined by the virtual combination object or one or more pages constituting the document file, a s a subgroup in the virtual combination object, wherein the second data region includes information on setting for processing the subgroup and a parameter according to the process setting; and a step for managing and processing the document files based on the information recorded in the virtual combination object and the index object.

15. The computer executable program according to claim 14, wherein in said virtual combination object editing step the virtual combination object is edited to create or delete the virtual combination object, combine the document files to the virtual combination object or reset this combination, and set an index object or reset this setting.

16. The computer executable program according to claim 14, wherein in said managing and processing step the document files are further managed and processed based on the information inputted in said input step.

17. The computer executable program according to claim 14, further comprising the step of displaying a state of document file management, including information on one or more document files, one or more pages included in the document files, one or more virtual combination objects and one or more index objects.

18. The computer executable program according to claim 14, wherein when the index object is set in the virtual combination object by said virtual combination editing step, said display step displays, on a display device, the setting of the index object in between the document files virtually combined to the virtual combination object or between pages of the document file, and when the index object, set in the virtual combination object by said virtual combination editing step, is deleted, said display step deletes the index object, displayed as being set in between the document files virtually combined to the virtual combination object or between the pages of the document file.

19. The computer executable program according to claim 14, wherein said managing step determines the document file or document files or a page or pages in the document file, to be virtually sub-grouped by the index object, by the position of the index object in the virtual combination object, which is set by said virtual combination editing step, and the document file or document files or a page or pages in the document file between the position and a second index object set subsequently to the index object are included in the subgroup, and when the second index object is not set, the document file or document files or a page or pages in the document file in between the position and a final page in the document file included in the end of the virtual combination object are included in the subgroup.

20. The computer executable program according to claim 14, wherein upon receipt of an operation command in units of index objects in said input step, said document file management step performs an operation, included in operations commanded by the operation command, on the document file or document files or the page or pages in the document file which are included in the subgroup defined by the index object.

21. The computer executable program according to claim 14, wherein when said virtual combination editing step virtually combines the virtual combination objects or the document files to create a second virtual combination object, said virtual combination editing step automatically sets the index object indicating a boundary of the document files or the virtual combination objects before the combination, which will be virtually combined to the second virtual combination object.

22. The computer executable program according to claim 14, wherein said virtual combination editing step decomposes the virtual combination of the virtual combination object to create the document file or document files not virtually combined by the virtual combination object or a new virtual combination object or new virtual combination objects in which at least part of the document files are virtually combined.

23. The computer executable program according to claim 14, wherein the index object is displayed in the form of index paper with the tab part, when displayed on a display device in said display step and, using a pointing device to serve as an input device, the tab part of the index object, displayed on the display device, is dragged and then dropped in the outside of the virtual combination object displayed on the display device, whereby said virtual combination editing step forms a new virtual combination object where the document files having been sub-grouped by the index object are virtually combined, and a display color of the new virtual combination object is set to agree with a display color of the dragged index object.

24. The computer executable program according to claim 14, wherein the index object has the form of index paper with the tab part, when displayed on a display device in said display step, and, using a pointing device to serve as an input device, a part except for the tab part of the index object, displayed on the display device, is dragged and then dropped in the outside of the virtual combination object displayed on the display device, whereby said virtual combination editing step deletes the dragged and dropped index object.

* * * * *

UNITED STATES PATENT AND TRADEMARK OFFICE
CERTIFICATE OF CORRECTION

PATENT NO.        : 7,516,162 B2                                         Page 1 of 1
APPLICATION NO.   : 11/022869
DATED             : April 7, 2009
INVENTOR(S)       : Takatoshi Mochizuki It is certified that error appears in the above-identified patent and that said Letters Patent is hereby corrected as shown below:

In column 16, line 63, please replace "lest" with --least--;

In column 19, line 9, please replace "a s" with --as--;

Signed and Sealed this

Twelfth Day of May, 2009

JOHN DOLL
*Acting Director of the United States Patent and Trademark Office*